US011905438B2

(12) United States Patent
Matzeit et al.

(10) Patent No.: US 11,905,438 B2
(45) Date of Patent: Feb. 20, 2024

(54) PROCESS OF MANUFACTURING A PRESSURE SENSITIVE ADHESIVE HAVING A LOW VOC CHARACTERISTICS

(71) Applicant: 3M INNOVATIVE PROPERTIES COMPANY, St. Paul, MN (US)

(72) Inventors: Niklas M. Matzeit, Cologne (DE); Pierre R. Bieber, Korschenbroich (DE); Petra M Stegmaier, Duesseldorf (DE); Eike H. Klünker, Kaarst (DE); Dmitri D. Iarikov, Gaithersburg, MD (US); Jeffrey M. Imsande, Menomonie, WI (US); Shijing Cheng, Woodbury, MN (US); Michele A. Craton, Cottage Grove, MN (US); George J. Clements, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 606 days.

(21) Appl. No.: 17/252,348

(22) PCT Filed: Jun. 20, 2019

(86) PCT No.: PCT/IB2019/055229
§ 371 (c)(1),
(2) Date: Dec. 15, 2020

(87) PCT Pub. No.: WO2019/244108
PCT Pub. Date: Dec. 26, 2019

(65) Prior Publication Data
US 2021/0269684 A1 Sep. 2, 2021
US 2021/0395579 A9 Dec. 23, 2021

(30) Foreign Application Priority Data

Jun. 22, 2018 (EP) .................................... 18179223

(51) Int. Cl.
C09J 133/08 (2006.01)
C08J 3/24 (2006.01)
(Continued)

(52) U.S. Cl.
CPC ............ *C09J 133/08* (2013.01); *B29C 48/08* (2019.02); *B29C 48/288* (2019.02); *B29C 48/40* (2019.02); *C08F 220/1808* (2020.02); *C08J 3/005* (2013.01); *C08J 3/247* (2013.01); *C09J 7/385* (2018.01); *B29K 2033/04* (2013.01); *C08F 2810/20* (2013.01); *C08J 3/24* (2013.01); *C08J 2333/08* (2013.01); *C08K 3/011* (2018.01); *C08K 5/0025* (2013.01);
(Continued)

(58) Field of Classification Search
None
See application file for complete search history.

(56) References Cited

U.S. PATENT DOCUMENTS

| 4,248,770 A | 2/1981 | Matsuo |
| 4,447,354 A | 5/1984 | Scharrer |

(Continued)

FOREIGN PATENT DOCUMENTS

| CN | 102337078 | 10/2013 |
| CN | 102908860 | 8/2015 |
| CN | 104530399 | 8/2016 |
| CN | 105504507 | 11/2017 |
| DE | 202009013255 | 3/2010 |
| EP | 0121125 | 10/1984 |
| EP | 0872528 | 10/1998 |

(Continued)

OTHER PUBLICATIONS

Pocius, Adhesion and Adhesives Technology: an Introduction—2nd Edition, (2002), Table of content, 8 pages.

(Continued)

*Primary Examiner* — Richard A Huhn
(74) *Attorney, Agent, or Firm* — Thomas M. Spielbauer

(57) ABSTRACT

The present disclosure relates to a process of manufacturing a pressure sensitive adhesive, comprising the steps of: a) providing a hot melt mixing apparatus comprising a reaction chamber; b) providing a hot melt processable pressure sensitive adhesive composition comprising: (1) a (meth) acrylate copolymer component comprising: i. C1-C32 (meth)acrylic acid ester monomer units; ii. optionally, ethylenically unsaturated monomer units having functional groups selected from the group consisting of acid, hydroxyl, acid anhydride, epoxide, amine, amide groups, and any combinations thereof; and iii. optionally, further ethylenically unsaturated monomer units which are copolymerizable with monomer units (i) and/or (ii); and (2) a crosslinking system selected from the group consisting of thermal crosslinking systems, actinic radiation crosslinking systems, and any combinations thereof; (3) optionally, at least one expandable microsphere; and (4) optionally, at least one pigment; c) providing a polymeric resin; d) subjecting the polymeric resin to a heating step (thereby at least partly remove low Volatile Organic Compounds (VOC) from the polymeric resin) thereby forming a cleaned polymeric resin; e) incorporating the cleaned polymeric resin and the hot melt processable pressure sensitive adhesive composition in the reaction chamber of the hot melt mixing apparatus; –57-f) mixing the hot melt processable pressure sensitive adhesive composition and the cleaned polymeric resin in the hot melt mixing apparatus thereby forming a hot melt blend; g) removing the hot melt blend from the hot melt mixing apparatus; and h) optionally, crosslinking the hot melt blend.

10 Claims, No Drawings

(51) Int. Cl.

| | | |
|---|---|---|
| *C09J 7/38* | (2018.01) | |
| *B29C 48/08* | (2019.01) | |
| *B29C 48/285* | (2019.01) | |
| *B29C 48/40* | (2019.01) | |
| *C08J 3/00* | (2006.01) | |
| *C08F 220/18* | (2006.01) | |
| *B29K 33/04* | (2006.01) | |
| *C08K 3/011* | (2018.01) | |
| *C08K 5/00* | (2006.01) | |

(52) U.S. Cl.
CPC .... *C09J 2203/326* (2013.01); *C09J 2203/354* (2020.08); *C09J 2301/304* (2020.08); *C09J 2301/50* (2020.08)

(56) References Cited

U.S. PATENT DOCUMENTS

| | | | |
|---|---|---|---|
| 4,758,379 | A | 7/1988 | Johnson, Jr. |
| 5,804,610 | A | 9/1998 | Hamer |
| 5,830,992 | A | 11/1998 | Whalen |
| 5,877,261 | A | 3/1999 | Harder |
| 5,969,092 | A | 10/1999 | Karvo |
| 6,294,249 | B1 | 9/2001 | Hamer |
| 6,562,888 | B1 | 5/2003 | Frihart |
| 7,262,242 | B2 | 8/2007 | Gielens |
| 7,910,163 | B2 | 3/2011 | Zollner |
| 7,935,383 | B2 | 5/2011 | Zollner |
| 8,449,962 | B2 | 5/2013 | Prenzel |
| 8,586,186 | B2 | 11/2013 | Naito |
| 8,802,777 | B2 | 8/2014 | Zöllner |
| 9,505,959 | B2 | 11/2016 | Grittner |
| 2003/0082362 | A1 | 5/2003 | Khandpur |
| 2004/0082700 | A1 | 4/2004 | Khandpur |
| 2005/0022476 | A1 | 2/2005 | Hamer |
| 2005/0217789 | A1* | 10/2005 | Eckstein ................ C09J 133/06 156/244.11 |
| 2008/0096034 | A1 | 4/2008 | Theelen |
| 2009/0053447 | A1 | 2/2009 | Zollner |
| 2009/0181250 | A1 | 7/2009 | Zmarsly |
| 2011/0274843 | A1 | 11/2011 | Grittner |
| 2011/0281964 | A1 | 11/2011 | Zmarsly |
| 2012/0029105 | A1 | 2/2012 | Czerwonatis |
| 2013/0184394 | A1 | 7/2013 | Satrijo |
| 2013/0190459 | A1 | 7/2013 | Prenzel |
| 2013/0190460 | A1 | 7/2013 | Prenzel |

FOREIGN PATENT DOCUMENTS

| | | | |
|---|---|---|---|
| EP | 0950081 | 10/1999 | |
| EP | 280371 | 12/2014 | |
| EP | 2808371 A1 * | 12/2014 | ............ C09J 11/00 |
| EP | 2832779 | 2/2015 | |
| EP | 3020773 | 5/2016 | |
| EP | 3020774 | 5/2016 | |
| EP | 3182446 | 6/2017 | |
| EP | 3243886 | 11/2017 | |
| EP | 3336153 | 6/2018 | |
| EP | 3336154 | 6/2018 | |
| JP | 2012-192323 | 10/2012 | |
| KR | 2012-0113550 | 10/2012 | |
| WO | WO 2001-044400 | 6/2001 | |
| WO | WO 2008-073669 | 6/2008 | |
| WO | WO 2017-106116 | 6/2017 | |

OTHER PUBLICATIONS

1507 Extended EP Search Report for EP18179223.5, dated Jan. 3, 2019, 2 pages.
International Search Report for PCT International Application No. PCT/IB2019/055229, dated Oct. 4, 2019, 4 pages.

* cited by examiner

PROCESS OF MANUFACTURING A PRESSURE SENSITIVE ADHESIVE HAVING A LOW VOC CHARACTERISTICS

CROSS REFERENCE TO RELATED APPLICATIONS

This application is a national stage filing under 35 U.S.C. 371 of PCT/IB2019/055229, filed Jun. 20, 2019, which claims the benefit of EP Application No. 18179223.5, filed Jun. 22, 2018, the disclosure of which is incorporated by reference in its/their entirety herein.

TECHNICAL FIELD

The present disclosure relates generally to the field of adhesives, more specifically to the field of pressure sensitive adhesives (PSA). The present disclosure also relates to a process of manufacturing such pressure sensitive adhesives and assemblies, and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives.

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

Pressure sensitive adhesives (PSAs) are well known to one of ordinary skill in the art, and according to the Pressure-Sensitive Tape Council, PSAs are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A.V. Pocius in Adhesion and Adhesives Technology: An Introduction, $2^{nd}$ Ed., Hanser Gardner Publication, Cincinnati, OH, 2002. These measurements taken together constitute the balance of properties often used to characterize a PSA.

With broadened use of pressure-sensitive adhesive tapes over the years, performance requirements have become more demanding Shear holding capability, for example, which originally was intended for applications supporting modest loads at room temperature, has now increased substantially for many applications in terms of operating temperature and load. Indeed, many applications require pressure sensitive adhesives to support a load at elevated temperatures, typically in the range of from 70° C. to 120° C., for which high cohesive strengths are required. Similarly, an increased need has arisen for pressure sensitive adhesives having improved and versatile adhesion characteristics; in particular with respect to peel forces and shear resistance on various types of difficult to adhere surfaces, such as in particular the so-called low surface energy (LSE) and medium surface energy (MSE) substrates.

In addition to increasing performance requirements with regard to pressure sensitive adhesives, volatile organic compounds (VOC) reduction regulations are becoming increasingly important in particular for various kind of interior applications (occupational hygiene and occupational safety) such as e.g. in the construction market or in the automotive or electronics industries. Known acrylate-based pressure sensitive adhesives typically contain notable amounts of low molecular weight organic residuals, such as un-reacted monomers arising from their polymerization process, polymerization initiator residuals, contaminations from raw materials or degradation products formed during the manufacturing process. These low molecular weight residuals qualifying as VOC may diffuse out of the adhesive tape and can be potentially harmful. Known acrylate-based pressure sensitive adhesives, if not crosslinked, also generally suffer from lack of cohesive strength and excessive tendency to flow. This aspect may render the application and processability of uncrosslinked acrylate-based pressure sensitive adhesives particularly problematic, especially when made by a hotmelt process.

The reduction of organic solvent usage in the manufacturing process of pressure sensitive adhesives has quickly emerged as one straightforward means to reduce the overall VOC levels. The use of specific scavengers for organic contaminants, as described in WO 01/44400 (Yang), is another alternative way to achieve reduced VOC levels. However, the solutions for reducing overall VOC levels known from the prior art are often associated with increased manufacturing complexity and production costs. Also, the overall VOC levels observed often do not fulfill the requirements for various kind of interior applications such as e.g. in the construction market or in the automotive or electronics industries. Further pressure sensitive adhesives provided with beneficial performance characteristics are described e.g. in US 2003/0082362 A1 (Khandpur et al.), in US 2004/0082700 A1 (Khandpur et al.), in WO 2008/073669 (Hanley et al.), and in EP 2 832 779 A1 (Bieber et al.).

Without contesting the technical advantages associated with the pressure sensitive adhesives known in the art, there is still a need for a robust and cost-effective process of manufacturing a pressure sensitive adhesive providing reduced overall VOC levels whilst providing excellent and versatile adhesion characteristics.

SUMMARY

According to one aspect, the present disclosure relates to a process of manufacturing a pressure sensitive adhesive, comprising the steps of:
a) providing a hot melt mixing apparatus comprising a reaction chamber;
b) providing a hot melt processable pressure sensitive adhesive composition comprising:
(1) a (meth)acrylate copolymer component comprising:
  i. $C_1$-$C_{32}$ (meth)acrylic acid ester monomer units;
  ii. optionally, ethylenically unsaturated monomer units having functional groups selected from the group consisting of acid, hydroxyl, acid anhydride, epoxide, amine, amide groups, and any combinations thereof; and iii. optionally, further ethylenically unsaturated monomer units which are copolymerizable with monomer units (i) and/or (ii); and (2) a crosslinking system selected from the group consisting of thermal crosslinking systems, actinic radiation crosslinking systems, and any combinations thereof;

(3) optionally, at least one expandable microsphere; and (4) optionally, at least one pigment;

c) providing a polymeric resin;

d) subjecting the polymeric resin to a heating step thereby forming a cleaned polymeric resin;

e) incorporating the cleaned polymeric resin and the hot melt processable pressure sensitive adhesive composition in the reaction chamber of the hot melt mixing apparatus;

f) mixing the hot melt processable pressure sensitive adhesive composition and the cleaned polymeric resin in the hot melt mixing apparatus thereby forming a hot melt blend;

g) removing the hot melt blend from the hot melt mixing apparatus; and h) optionally, crosslinking the hot melt blend.

In another aspect, the present disclosure relates to a pressure sensitive adhesive comprising a hot melt processable pressure sensitive adhesive composition and a crosslinking system as described above, and wherein the pressure sensitive adhesive has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermal desorption analysis according to test method VDA278.

In still another aspect, the present disclosure relates to a pressure sensitive adhesive assembly comprising a first pressure sensitive adhesive layer, wherein the first pressure sensitive adhesive layer comprises a pressure sensitive adhesive as described above or a crosslinked pressure sensitive adhesive as described above.

According to still another aspect, the present disclosure relates to the use of a pressure sensitive adhesive or a crosslinked pressure sensitive or a pressure sensitive adhesive assembly as described above for industrial applications, in particular for construction market applications, transportation market applications, and electronic applications.

DETAILED DESCRIPTION

According to a first aspect, the present disclosure relates to a process of manufacturing a pressure sensitive adhesive, comprising the steps of:

a) providing a hot melt mixing apparatus comprising a reaction chamber;

b) providing a hot melt processable pressure sensitive adhesive composition comprising:

(1) a (meth)acrylate copolymer component comprising:

i. $C_1$-$C_{32}$ (meth)acrylic acid ester monomer units;

ii. optionally, ethylenically unsaturated monomer units having functional groups selected from the group consisting of acid, hydroxyl, acid anhydride, epoxide, amine, amide groups, and any combinations thereof; and iii. optionally, further ethylenically unsaturated monomer units which are copolymerizable with monomer units (i) and/or (ii); and (2) a crosslinking system selected from the group consisting of thermal crosslinking systems, actinic radiation crosslinking systems, and any combinations thereof;

(3) optionally, at least one expandable microsphere; and (4) optionally, at least one pigment;

c) providing a polymeric resin;

d) subjecting the polymeric resin to a heating step (thereby at least partly remove low Volatile Organic Compounds (VOC) from the polymeric resin) thereby forming a (pre-)cleaned polymeric resin;

e) incorporating the (pre-)cleaned polymeric resin and the hot melt processable pressure sensitive adhesive composition in the reaction chamber of the hot melt mixing apparatus;

f) mixing the hot melt processable pressure sensitive adhesive composition and the (pre-)cleaned polymeric resin in the hot melt mixing apparatus thereby forming a hot melt blend;

g) removing the hot melt blend from the hot melt mixing apparatus; and h) optionally, crosslinking the hot melt blend.

In the context of the present disclosure, it has surprisingly been found that a process of manufacturing a pressure sensitive adhesive as described above allows producing pressure sensitive adhesives having reduced overall VOC levels whilst providing excellent and versatile adhesion characteristics, in particular with respect to peel forces and shear resistance on various types of difficult to adhere surfaces, such as in particular low surface energy (LSE) and medium surface energy (MSE) substrates.

In some advantageous aspects, the pressure sensitive adhesives and assemblies as described herein are characterized by very low or even substantial absence of perceptible odor. In some aspects, the pressure sensitive adhesives and assemblies according to the present disclosure are characterized by further providing excellent characteristics and performance as to overall fogging levels reduction. The low fogging characteristics typically translate into improved resistance of outgassed components to condensation, as well as improved thermal stability of the corresponding pressure sensitive adhesive assembly.

The pressure sensitive adhesives obtained by the method of the invention are particularly suitable for interior applications, in particular for construction market applications and transportation market applications, and for electronic applications, in particular for the fixation of display panels in mobile hand held electronic devices.

Without wishing to be bound by theory, it is believed that this outstanding suitability is due in particular to the specific step of subjecting the polymeric resin to a heating step (thereby at least partly remove low Volatile Organic Compounds (VOC) from the polymeric resin) thereby forming a (pre-)cleaned polymeric resin, and to the use of a hot melt processable pressure sensitive adhesive composition as described above in combination with a hot melt mixing apparatus. Still without wishing to be bound by theory, it is believed that the specific chronology of the steps of: (a) subjecting the polymeric resin to a heating step (thereby at least partly remove low Volatile Organic Compounds (VOC) from the polymeric resin) thereby forming a (pre-)cleaned polymeric resin, and (b) incorporating the (pre-)cleaned polymeric resin and the hot melt processable pressure sensitive adhesive composition in the reaction chamber of the hot melt mixing apparatus, plays a crucial role in obtaining the properties and matching the performance characteristics as detailed above.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE), and blends of polypropylene (e.g. PP/EPDM, TPO).

In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, polycarbonate (PC), polyvinylchloride (PVC), polyamide (PA), polyurethanes (PUR), thermoplastice elastomers (TPE), polyoxymethylene (POM), polystyrene (PS), poly(methyl methacrylate) (PMMA), clear coat surfaces, in particular clear coats for vehicles like a car or coated surfaces for industrial applications and composite materials like fiber reinforced plastics.

The surface energy is typically determined from contact angle measurements as described, for example, in ASTM D7490-08.

In the context of the present disclosure, the expressions "curing" and "crosslinking" are used interchangeably. The term "crosslinking" is meant to refer to the forming of covalent and/or coordinative chemical bonds between polymer chains. In particular, radiation-induced crosslinking (such as UV-induced crosslinking) and thermal crosslinking, which is crosslinking induced by thermal treatment, are fully within the definition of the term "crosslinking" used throughout the present description.

The term "uncrosslinked" is meant to express that the (curable) precursor of a pressure sensitive adhesive has a degree of crosslinking of less than 5%, typically less than 3%, less than 2%, less than 1%, or even less than 0.5%. The degree of crosslinking of the (curable) precursor of a pressure sensitive adhesive may be determined according to any techniques commonly known to those skilled in the art. Unless otherwise stated, the degree of crosslinking is determined according to swelling techniques, in particular according to standard method ASTM D2765-11, using tetrahydrofuran as extraction solvent.

In the context of the present disclosure, the expression "partially crosslinked" is meant to express that the (curable) precursor of a pressure sensitive adhesive has a degree of crosslinking of more than 5%, typically more than 10%, more than 15%, or even more than 20%.

As will be easily apparent to those skilled in the art, the term "reaction chamber" is meant to refer to a closed region or area of the hot melt mixing apparatus, where separate incoming addition streams are combined and contact one another. The reactants of the addition streams mix and chemically react with one another thereby forming a reaction product stream, where one or the other of the reactants may surround the other. The reaction chamber may contain several segments, each operating at the same or different working conditions, such as mixing and conveying regimes. Each segment may provide suitable addition ports for the various addition streams.

In the context of the present disclosure, the term "addition stream" is meant to refer to reactants and reagents (such as e.g. the (meth)acrylate copolymer component, the polymeric resin or the crosslinking system) flowing from an entry location to the reaction chamber of the hot melt mixing apparatus.

The process of manufacturing a pressure sensitive adhesive according to the present disclosure, comprises as a first step, providing a hot melt processable pressure sensitive adhesive composition comprising, as a first technical feature:

(1) a (meth)acrylate copolymer component comprising:
   i. $C_1$-$C_{32}$ (meth)acrylic acid ester monomer units;
   ii. optionally, ethylenically unsaturated monomer units having functional groups selected from the group consisting of acid, hydroxyl, acid anhydride, epoxide, amine, amide groups, and any combinations thereof; and
   iii. optionally, further ethylenically unsaturated monomer units which are copolymerizable with monomer units (i) and/or (ii).

In the context of the present disclosure, the terms "(meth)acrylate copolymer" and "polyacrylate" may be used interchangeably.

The (meth)acrylate copolymer component for use herein comprises:
   i. $C_1$-$C_{32}$ (meth)acrylic acid ester monomer units;
   ii. optionally, ethylenically unsaturated monomer units having functional groups selected from the group consisting of acid, hydroxyl, acid anhydride, epoxide, amine, amide groups, and any combinations thereof; and
   iii. optionally, further ethylenically unsaturated monomer units which are copolymerizable with monomer units (i) and/or (ii);

As used herein, the term "alkyl (meth)acrylic acid ester", "alkyl (meth)acrylate" and "alkyl (meth)acrylate ester" are used interchangeably. The term "(meth)acrylate" refers to an acrylate, methacrylate, or both. The term "(meth)acrylic" refers to methacrylic, acrylic, or both. A (meth)acrylic-based" material refers to one prepared from one or more monomers having a (meth)acryloyl group, which is a group of formula $CH_2$=$C(R)$—(CO)— where R is hydrogen or methyl.

The term "alkyl" refers to a monovalent group which is a saturated hydrocarbon. The alkyl can be linear, branched, cyclic, or combinations thereof and typically has 1 to 32 carbon atoms. In some embodiments, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl, iso-octyl and 2-propylheptyl.

The (meth)acrylate copolymer component for use herein comprises $C_1$-$C_{32}$ (meth)acrylic acid ester monomer units. Suitable $C_1$-$C_{32}$ (meth)acrylic acid ester monomer units for use herein may be easily identified by those skilled in the art, in the light of the present disclosure.

In a typical aspect, the (meth)acrylate copolymer component for use herein comprises linear or branched alkyl (meth)acrylate ester, preferably a non-polar linear or branched alkyl (meth)acrylate ester having a linear or branched alkyl group comprising from 1 to 32 carbon atoms.

In a particular aspect of the present disclosure, the $C_1$-$C_{32}$ (meth)acrylic acid ester monomer units for use herein are selected from the group of $C_1$-$C_{25}$ (meth)acrylic acid ester monomer units, $C_1$-$C_{20}$ (meth)acrylic acid ester monomer units, $C_1$-$C_{18}$ (meth)acrylic acid ester monomer units, $C_2$-$C_{16}$ (meth)acrylic acid ester monomer units, $C_2$-$C_{14}$ (meth)acrylic acid ester monomer units, or even $C_2$-$C_{14}$ (meth)acrylic acid ester monomer units.

In another particular aspect, the $C_1$-$C_{32}$ (meth)acrylic acid ester monomer units for use herein are selected from the group of $C_4$-$C_{30}$ (meth)acrylic acid ester monomer units, $C_4$-$C_{14}$ (meth)acrylic acid ester monomer units, or even from the group of $C_4$-$C_9$ (meth)acrylic acid ester monomer units.

According to another particular aspect of the present disclosure, the $C_1$-$C_{32}$ (meth)acrylic acid ester monomer units are selected from the group consisting of $C_4$-$C_9$ (meth)acrylic acid ester monomer units, preferably from the group consisting of n-butyl acrylate, n-butyl methacrylate, n-pentyl acrylate, n-pentyl methacrylate, n-amyl acrylate, n-hexyl acrylate, hexyl methacrylate, n-heptyl (meth)acrylate, n-octyl acrylate, n-octyl methacrylate, n-nonyl (meth)acrylate, isobutyl (meth)acrylate, isooctyl acrylate, isooctyl methacrylate, 2-ethylhexyl acrylate, 2-ethylhexyl methacrylate, 2-octyl acrylate, and any combinations or mixtures thereof.

In another exemplary aspect, the $C_1$-$C_{32}$ (meth)acrylic acid ester monomer units are selected from the group consisting of $C_{10}$-$C_{30}$ (meth)acrylic acid ester monomer units, preferably from the group consisting of propylheptyl (meth)acrylate, (meth)acrylic acid esters of 2-alkyl alkanols (also known as Guerbet alcohols), in particular (meth)acrylic acid esters derived from a $C_{12}$-$C_{30}$ 2-alkyl alkanol and any combinations or mixtures thereof.

In a preferred aspect of the present disclosure, the $C_1$-$C_{32}$ (meth)acrylic acid ester monomer units are selected from the group consisting of isooctyl acrylate, 2-ethylhexyl acrylate, and any combinations or mixtures thereof.

In another exemplary aspect, the $C_1$-$C_{32}$ (meth)acrylic acid ester monomer units are selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

In an advantageous aspect, the $C_1$-$C_{32}$ (meth)acrylic acid ester monomer units are selected from the group consisting of iso-octyl (meth)acrylate, 2-ethylhexyl (meth)acrylate, 2-propylheptyl (meth)acrylate, 2-octyl (meth)acrylate, butyl acrylate, and any combinations or mixtures thereof; more preferably from the group consisting of iso-octyl acrylate, 2-ethylhexyl acrylate, 2-octyl acrylate, and 2-propylheptyl acrylate.

In another aspect, the $C_1$-$C_{32}$ (meth)acrylic acid ester monomer units are selected from the group consisting of 2-ethylhexyl acrylate, and iso-octyl acrylate. In a particularly preferred aspect, the polymeric base material for use herein comprises or consists of 2-ethylhexyl acrylate.

According to another advantageous aspect, the $C_1$-$C_{32}$ (meth)acrylic acid ester monomer units comprise 2-octyl (meth)acrylate. The 2-octyl (meth)acrylate may be prepared by conventional techniques from 2-octanol and (meth)acryloyl derivates such as esters, acids and acyl halides. The 2-octanol may be prepared by treatment of ricinoleic acid, derived from castor oil, (or ester or acyl halide thereof) with sodium hydroxide, followed by distillation from the co-product sebacic acid.

It is however preferred that the 2-octyl(meth)acrylate monomer for use herein is at least partly, preferably completely (i.e. 100 wt %) derived from biological material, more preferably from a plant material. This may advantageously be used to provide adhesive films/tapes which are at least partly derived from "green" sources, which is ecologically more sustainable and also reduces the dependency on mineral oil and the price development.

In the context of the present disclosure, the term "derived from biological material" is meant to express that from a certain chemical ingredient, at least a part of its chemical structure comes from biological materials, preferably at least 50 wt % of its structure. This definition is in principle the same as for bio-diesel fuel, in which usually only the fatty acid part originates from biological sources whereas the methanol may also be derived from fossil material like coal or mineral oil.

Accordingly, in one particular aspect, at least 50 wt %, at least 75 wt %, or even 100 wt % of the chemical structure of the 2-octyl(meth)acrylate is at least partly, preferably completely (i.e. 100 wt %) derived from biological material, more preferably from a plant material.

The $C_1$-$C_{32}$ (meth)acrylic acid ester monomer units for use herein may be present in the (meth)acrylate copolymer component in any suitable amounts. In some exemplary aspects, the $C_1$-$C_{32}$ (meth)acrylic acid ester monomer units for use herein may be present in the (meth)acrylate copolymer component in an amount of from 45 wt % to 99 wt %, based on the weight of the (meth)acrylate copolymer component.

The (meth)acrylate copolymer component for use herein further comprises ethylenically unsaturated monomer units having functional groups selected from the group consisting of acid, hydroxyl, acid anhydride, epoxide, amine, amide groups, and any combinations thereof. Suitable ethylenically unsaturated monomer units having required functional groups may be easily identified by those skilled in the art, in the light of the present disclosure.

In an advantageous aspect, the functional groups present in the ethylenically unsaturated monomer units for use herein are able to enter into a reaction with epoxide groups. According to an exemplary aspect of the present disclosure, the ethylenically unsaturated monomer units having functional groups are selected from the group of ethylenically unsaturated monomer units having functional groups selected from the group consisting of carboxyl, carboxylic acid, sulphonic acid, phosphonic acid, hydroxyl, acid anhydride, epoxide, amine, amide groups, and any combinations thereof.

In a particular aspect, the ethylenically unsaturated monomer units having functional groups for use herein are selected from the group of ethylenically unsaturated monomer units having functional groups selected from the group consisting of carboxyl, hydroxyl, and any combinations thereof.

In another particular aspect of the present disclosure, the ethylenically unsaturated monomer units having functional groups for use herein are selected from the group consisting of acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, and any combinations or mixtures thereof.

According to a preferred aspect, the ethylenically unsaturated monomer units having functional groups are selected from the group of acrylic acid monomers.

The ethylenically unsaturated monomer units having functional groups for use herein may be present in the (meth)acrylate copolymer component in any suitable amounts. In some exemplary aspects, the ethylenically unsaturated monomer units having functional groups for use herein may be present in the (meth)acrylate copolymer component in an amount of from 1 wt % to 15 wt %, based on the weight of the (meth)acrylate copolymer component.

The (meth)acrylate copolymer component for use herein may further comprise, as an optional ingredient, further ethylenically unsaturated monomer units which are copolymerizable with monomer units (i) and/or (ii). Suitable further ethylenically unsaturated monomer units which are copolymerizable with monomer units (i) and/or (ii) may be easily identified by those skilled in the art, in the light of the present disclosure.

As further ethylenically unsaturated monomer units which are copolymerizable with monomer units (i) and/or (ii), it is possible in principle to use all compounds with vinylic functionalization which are copolymerizable with monomer units (i) and/or (ii). The further ethylenically unsaturated monomer units for use herein may advantageously serve to adjust the properties of the resultant pressure sensitive adhesive composition.

Suitable further ethylenically unsaturated monomer units for use herein include, but are not limited to, those selected from the group consisting of methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclo-hexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylamino-ethyl acrylate, diethylaminoethyl methacrylate, dimethylaminoethyl acrylate, dimethyl-aminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8-pentadecafluorooctyl methacrylate, dimethylaminopropyl-acrylamide, dimethylaminopropyl-methacrylamide, N-(1-methylundecypacrylamide, N-(n-butoxymethyl)acrylamide, N-(butoxymethyl)methacrylamide, N-(ethoxymethyl)-acrylamide, N-(n-octadecyl)acrylamide, and also N,N-dialkyl-substituted amides, such as, for example, N,N-dimethylacrylamide, N,N-dimethylmethacrylamide, N-benzylacrylamide, N-isopropylacrylamide, N-tert-butylacrylamide, N-tert-octylacrylamide, N-methylolacryl-amide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight Mw from 4000 to 13 000 g/mol), poly(methyl methacrylate)ethyl methacrylate (Mw from 2000 to 8000 g/mol).

In an advantageous aspect of the present disclosure, the optional further ethylenically unsaturated monomer units which are copolymerizable with monomer units (i) and/or (ii) are selected from the group consisting of methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, and any combinations or mixtures thereof.

According to a particular aspect, the optional further ethylenically unsaturated monomer units which are copolymerizable with monomer units (i) are selected from the group consisting of methyl acrylate, ethyl acrylate, isobornyl acrylate, and any combinations or mixtures thereof.

The further ethylenically unsaturated monomer units which are copolymerizable with monomer units (i) and/or (ii) for use herein may be present in the (meth)acrylate copolymer component in any suitable amounts. In some exemplary aspects, the further ethylenically unsaturated monomer units which are copolymerizable with monomer units (i) and/or (ii) for use herein may be present in the (meth)acrylate copolymer component in an amount of from 0 wt % to 40 wt %, based on the weight of the (meth)acrylate copolymer component.

In a particular aspect, the (meth)acrylate copolymer component for use herein comprises:
  a) from 45 wt % to 99 wt % of $C_1$-$C_{32}$ (meth)acrylic acid ester monomer units, based on the weight of the (meth)acrylate copolymer component;
  b) optionally, from 1 wt % to 15 wt % of ethylenically unsaturated monomer units having functional groups, based on the weight of the (meth)acrylate copolymer component; and
  c) optionally, from 0 wt % to 40 wt % of further ethylenically unsaturated polar monomer units which are copolymerizable with monomer units (i) and/or (ii), based on the weight of the (meth)acrylate copolymer component.

In the context of the present disclosure, the (meth)acrylate copolymer component for use herein may be present in the pressure sensitive adhesive composition in any suitable amounts. In some exemplary aspects, the (meth)acrylate copolymer component may be present in the pressure sensitive adhesive composition in an amount of from 20 wt % to 80 wt %, from 20 wt % to 70 wt %, from 25 wt % to 60 wt %, or even from 25 wt % to 50 wt % based on the weight of the pressure sensitive adhesive composition.

The (meth)acrylate copolymer component for use herein may be prepared by processes familiar to the skilled person, with particular advantage by conventional free-radical polymerizations or controlled radical polymerizations. A variety of conventional free radical polymerization methods, including solution, bulk (i.e., with little or no solvent), dispersion, emulsion, and suspension processes, which processes are familiar to the skilled person. The particular method used may be influenced by the use of the final pressure sensitive adhesive composition. The reaction product of the polymerizable materials can be random or block copolymers. The polyacrylates may be prepared by copolymerization of the monomeric components using the usual polymerization initiators and also, where appropriate, regulators (chain transfer agents), with polymerization taking place at the customary temperatures in bulk, in emulsion, such as in water or liquid hydrocarbons, for example, or in solution.

In an advantageous aspect, the (meth)acrylate copolymer component is prepared by polymerization of the monomers in solvents, more particularly in solvents with a boiling range from 50 to 150° C. or from 60 to 120° C., using the customary amounts of polymerization initiators, these generally being 0.01% to 5%, more particularly 0.1% to 2%, by weight (based on the total weight of the monomers).

In some other methods of preparing the (meth)acrylate copolymer component for use herein, the (co)polymerizable material containing the monomers is partially polymerized so as to increase its viscosity to that corresponding to a viscous material. Generally, the main monomers and other optional monomers are mixed with a portion of the free radical polymerization initiator. Depending on the type of initiator added, the mixture is typically exposed to actinic radiation or heat to partially polymerize the monovalent monomers (i.e., monomers with a single ethylenically unsaturated group).

An initiator for free radical polymerization is typically added to the various monomers used to form the (co) polymerizable material, precursor of the (meth)acrylate copolymer component for use herein. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of (co)polymerizable material. Suitable in principle are all customary initiators that are familiar to the skilled person. Examples of free-radical sources are peroxides, hydroperoxides, and azo compounds, e.g., dibenzoyl peroxide, cumene hydroperoxide, cyclohexanone peroxide, di-tert-butyl peroxide, cyclohexylsulphonyl acetyl peroxide, diisopropyl percarbonate, tert-butyl peroctoate, benzopinacol. In one very preferred procedure, use is made as radical initiator of 2,2'-azobis(2-methylbutyronitrile) (Vazo® 67™ from DuPont) or 2,2'-azobis-(2-methylpropionitrile) (2,2'-azobisisobutyronitrile; AIBN; Vazo® 64™ DuPont).

In some aspects, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium, potassium). Suitable oil-soluble initiators include, but are not limited to, various azo compounds such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In some other aspects, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ) or under the trade designation ESACURE KB-1 from Sartomer (Exton, PA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethyl-amino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The particular (co)polymerizable material used to produce the (meth)acrylate copolymer component may optionally further contain chain transfer agents to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture may contain 0.01 to 0.5 weight percent, 0.05 to 0.5 weight percent, or 0.05 to 0.2 weight percent chain transfer agent.

The (co)polymerizable material used to produce the (meth)acrylate copolymer component may include an organic solvent or may be free or essentially free of an organic solvent. As used herein, the term "essentially free" in reference to an organic solvent means that the organic solvent is present in an amount of less than 5 weight percent, less than 4 weight percent, less than 3 weight percent, less than 2 weight percent, or less than 1 weight percent based on the weight of the polymerizable material. If an organic solvent is included in the polymerizable material, the amount is often selected to provide the desired viscosity. Examples of suitable organic solvents include, but are not limited to, methanol, tetrahydrofuran, ethanol, isopropanol, isobutanol, heptane, acetone, methyl ethyl ketone, methyl isobutyl ketone, methyl acetate, ethyl acetate, toluene, xylene, ethylene glycol alkyl ether, and any combinations or mixtures thereof. In a particular aspect, it is made use of mixtures containing isopropanol, particularly in amounts of 2% to 15% by weight, preferably 3% to 10% by weight, based on the solution mixture used.

According to a particular of the present disclosure, the hot melt processable (uncrosslinked curable precursor of a) pressure sensitive adhesive composition for use herein is obtained by a manufacturing process comprising any of solvent-based polymerization steps, solvent concentration steps, solvent stripping-off steps, solvent recycling steps, steam distillation steps, solvent distillation steps, and any combinations thereof.

According to an alternative aspect, the hot melt processable (uncrosslinked curable precursor of a) pressure sensitive adhesive composition for use herein is obtained by a solvent-free manufacturing method.

In one advantageous aspect of the disclosure, the hot melt processable (uncrosslinked curable precursor of a) pressure sensitive adhesive composition is obtained by a manufacturing process, which is free of any of devolatilization steps, degassing steps, in particular using entrainers or vacuum, solvent concentration steps, solvent stripping-off steps, solvent recycling steps, steam distillation steps, solvent distillation steps, and any combinations thereof.

In an alternative aspect of the disclosure, the hot melt processable (uncrosslinked curable precursor of a) pressure sensitive adhesive composition is further subjected to any of devolatilization steps or melt degassing steps, in particular using entrainers or vacuum, VOC scavengers, distillation steps, solvent distillation steps, and any combinations thereof.

According to one advantageous aspect of the present disclosure, the hot melt processable pressure sensitive adhesive composition is contained within a packaging material and forms a packaged pressure sensitive adhesive composition prior to the step of incorporating the hot melt processable pressure sensitive adhesive composition in the hot melt mixing apparatus. According to this beneficial aspect, the process of the present disclosure comprises the step of combining the hot melt processable pressure sensitive adhesive composition with the packaging material by (completely) surrounding the hot melt processable pressure sensitive adhesive composition with the packaging material to form the packaged pressure sensitive adhesive composition.

In a beneficial execution, the packaged hot melt adhesive composition is in the form of a pouch, in particular a thermoplastic pouch. Typically, the packaging material comprises a base material, which is in particular a polymer base material, having preferably a melting point of no greater than 200° C., no greater than 180° C., or even no greater than 160° C. More preferably, the packaging material comprises a base material, in particular a polymer base material, having a melting point in a range from 90° C. to 150° C.

According to an advantageous aspect of the present disclosure, the packaging material for use herein comprises a base material, in particular a thermoplastic polymer base material, which is typically selected from the group consisting of ethylene-vinyl acetate, ethylene-acrylic acid, polypropylene, polyethylene, polybutadiene, ionic films, and any combinations or mixtures thereof. More advantageously, the packaging material for use herein comprises a thermoplastic polymer base material selected from the group consisting of ethylene-vinyl acetate, ethylene-acrylic acid, and any combinations or mixtures thereof. Suitable packaged hot melt adhesive compositions and packaging material for use herein are disclosed e.g. in U.S. Pat. No. 5,804,610 (Hamer et al.), US-A1-2005/0022476 (Hamer et al.) and in US-A1-2013/0184394 (Satrijo et al.), the full content of which is herewith incorporated by reference.

The hot melt processable pressure sensitive adhesive composition for use herein further comprises a crosslinking system selected from the group consisting of thermal crosslinking systems, actinic radiation crosslinking systems, and any combinations thereof.

Crosslinking systems for use herein are not particularly limited, as long as they fall within the two categories of crosslinking systems described above. Suitable crosslinking systems for use herein may be easily identified by those skilled in the art, in the light of the present disclosure.

In one particular aspect of the process according to the disclosure, the crosslinking system for use herein is an actinic radiation crosslinking system. More particularly, the crosslinking system for use herein may be selected from UV or e-beam crosslinking systems.

According to one advantageous aspect where an actinic radiation crosslinking system is used, the crosslinking system is beneficially selected to comprise multifunctional (meth)acrylate compounds. One particular example of multifunctional (meth)acrylate compound for use herein includes, but is not limited to, 1,6-Hexanedioldiacrylate (HDDA), which is a di-functional acrylic monomer commercially available from BASF SE, Germany.

According to another particular aspect of the process according to the disclosure, the crosslinking system for use herein is a thermal crosslinking system, which typically comprises a thermal crosslinker, and optionally a crosslinking accelerator.

In the context of the present disclosure, the term "accelerator" is meant to refer to a substance which supports the crosslinking reaction by ensuring a significantly increased crosslinking reaction rate in comparison to the absence of the accelerator.

Any commonly known thermal crosslinking system may be used in the context of the present disclosure.

In a particular aspect, the thermal crosslinker for use herein is selected from the group of compounds comprising functional groups selected from the group consisting of epoxide, oxazoline, oxetane, blocked or non-blocked isocyanate, aziridine, and any combinations or mixtures thereof.

According to an advantageous aspect, the thermal crosslinker for use herein is selected from the group of compounds comprising at least one epoxide group. Suitable thermal crosslinkers containing epoxide groups are in particular polyfunctional epoxides, i.e. those which have at least two epoxide functions per molecule (i.e. are at least difunctional in respect of the epoxide groups). They may be either aromatic or aliphatic compounds.

Examples of suitable polyfunctional epoxides are oligomers of epichlorohydrin, epoxy ethers of polyhydric alcohols (more particularly ethylene, propylene and butylene glycols, polyglycols, thiodiglycols, glycerol, pentaerythritol, sorbitol, polyvinyl alcohol, polyallyl alcohol and the like); epoxy ethers of polyhydric phenols (more particularly resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dichlorophenyl)propane, bis(4-hydroxyphenyl)phenylmethane, bis(4-hydroxyphenyl)diphenylmethane, bis(4-hydroxyphenyl)-4'-methylphenyl)methane, 1,1-bis(4-hydroxyphenyl)-2,2,2-trichloroethane, bis(4-hydroxyphenyl)-(4-chlorophenyl)methane, 1,1-bis(4- hydroxyphenyl)cyclohexane, bis(4-hydroxyphenyl) cyclohexylmethane, 4,4'-dihydroxybiphenyl, 2,2'-dihydroxybiphenyl, 4,4'-dihydroxydiphenyl sulphone) and also their hydroxyethyl ethers; phenol-formaldehyde condensation products such as phenol alcohols, phenol aldehyde resins and the like; S- and N-containing epoxides (for example N,N-diglycidylaniline, N,N' dimethyldiglycidyl-4, 4-diaminodiphenylmethane) and also epoxides prepared by customary methods from polyunsaturated carboxylic acids or monounsaturated carboxylic esters of unsaturated alcohols, glycidyl esters, polyglycidyl esters, which may be obtained by polymerization or copolymerization of glycidyl esters of unsaturated acids, or are obtainable from other acidic compounds (cyanuric acid, diglycidyl sulphide, cyclic trimethylene trisulphone and/or derivatives thereof, and others).

Examples of ethers containing epoxide groups that are very suitable in accordance with the disclosure include 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether and bisphenol F diglycidyl ether.

According to an advantageous aspect of the present disclosure, the thermal crosslinking system for use herein comprises a thermal crosslinker and a crosslinking accelerator. Identifying suitable crosslinking accelerators for use herein is well within the capability of those skilled in the art, in the light of the present disclosure.

In an exemplary aspect of the present disclosure, the crosslinking accelerator for use herein is selected from the group consisting of amines, amides polyamines, polyamides, functional amines and polyamines, functional amides and polyamides, polyfunctional amines and polyamines, polyfunctional amides and polyamides, and any combinations or mixtures thereof.

According to an advantageous aspect, the crosslinking accelerator for use herein is selected from the group of compounds comprising amino groups or amino functionalities. In the context of the present disclosure, the term "amino groups" or "amino functionalities" is meant to refer both to —$NH_2$ groups and to secondary and tertiary amino groups, in which one or both hydrogen atoms are substituted, particularly by substituted or unsubstituted alkyl groups.

Suitable crosslinking accelerators for use herein include, but are not limited to, 2,2-(di-tert-butylphosphino)ethylamine, 2,2-(diisopropylphosphino)ethylamine, 2,2-(diphenylphosphino)ethylamine, N-(3-dimethylaminopropyl)-N,N-diisopropanolamine, (1R,2R)-2-(benzyloxy)cyclohexylamine and (1S,2S)-2-(benzyloxy)cyclohexylamine, N,N-dimethylethanolamine, bis(2-dimethylaminoethyl)ether, N,N,N'-trimethyl-N'-hydroxyethyl-bisaminoethyl ether, 2-(2-dimethylaminoethoxy)ethanol, N,N,N'-trimethylaminoethyl-ethanolamine, 2,2'-dimorpholinodiethyl ether, trans-2-aminocyclohexanol, cis-2-amino-cyclohexanol, bis(2-hydroxycyclohexyl)methylamine, N-cyclopentyl-2-methoxycyclohexylamine and (1S,2S)-2-(diphenylphosphino)cyclohexylamine.

Suitable thermal crosslinkers for use herein may also include isocyanates, more particularly trimerized isocyanates and/or sterically hindered isocyanates that are free of blocking agents. Advantageous crosslinker systems and methods are described e.g. in the descriptions of DE 202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, DE 10 2008 059 050 A, US 2013/0190459 and US 2013/0190460, the relevant contents of which are herewith incorporated by reference. Particularly advantageous crosslinker systems and methods are described in EP 0 752 435 A1, EP 1 978 069 A1, US 2013/0190459 and US 2013/0190460. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

In the context of the present disclosure, the crosslinking system for use herein may be present in the hot melt processable pressure sensitive adhesive composition in any suitable amounts. In some exemplary aspects, the crosslinking system may be present in the hot melt processable pressure sensitive adhesive composition in an amount of from 0.1 wt % to 10 wt %, from 0.1 wt % to 6 wt %, from 0.2 wt % to 5 wt %, or even from 0.2 wt % to 4 wt %, based on the weight of the hot melt processable pressure sensitive adhesive composition.

According to one particular aspect of the present disclosure, the hot melt blend for use herein is substantially free of actinic-radiation crosslinking agents, in particular free of UV crosslinking agents.

The hot melt processable pressure sensitive adhesive composition for use herein further comprises a polymeric resin.

Polymeric resins for use herein are not particularly limited. Suitable polymeric resins for use herein may be easily identified by those skilled in the art, in the light of the present disclosure, and include any polymeric resins typically used in the formulation of acrylic-based pressure sensitive adhesive compositions.

In a typical aspect of the present disclosure, the polymeric resin for use herein is selected from the group consisting of tackifying resins, plasticizing resins, and any combinations or mixtures thereof.

According to an advantageous aspect, the polymeric resin for use in the present disclosure comprises a tackifying tackifying resin. Any commonly known tackifying resin may be used in the context of the present disclosure. Suitable tackifying resins for use herein may be easily identified by those skilled in the art, in the light of the present disclosure.

Any tackifiers that are included in the particular hot melt processable pressure-sensitive adhesive compositions are typically selected to be miscible with the polymerizable material. Any tackifier typically included in conventional pressure-sensitive adhesive compositions may be used. Either solid or liquid tackifiers can be added. Solid tackifiers generally have a weight average molecular weight (Mw) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the particular pressure-sensitive adhesive composition. Combinations of various tackifiers can be used if desired.

Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company under the trade designations PERMALYN, STAYBELITE, and FORAL as well as from Newport Industries under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feed stocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobile Chemical under the trade designation ESCOREZ, and from Newport Industries under the trade designations NURES and H-REZ (Newport Industries).

Suitable tackifying resins include, for example, terpene phenolics, rosins, rosin esters, esters of hydrogenated rosins, synthetic hydrocarbon resins and combinations thereof. Especially suitable tackifying resins include the commercially available tackifying resins: FORAL 85E (a glycerol ester of highly hydrogenated refined gum rosin) commercially available from Eastman, Middelburg, NL), FORAL 3085 (a glycerol ester of highly hydrogenated refined wood rosin) commercially available from Hercules Inc., Wilmington, DE; ESCOREZ 2520 and ESCOREZ 5615 (aliphatic/aromatic hydrocarbon resins) commercially available from ExxonMobil Corp., Houston, TX; and Regalite 7100 (a partially hydrogenated hydrocarbon resin) commercially available from Eastman, Kingsport, Tennessee.

In one advantageous aspect of the present disclosure, the tackifying resin for use in the hot melt processable pressure sensitive adhesive composition is selected from the group consisting of C5-based hydrocarbon resins, C9-based hydrocarbon resins, C5/C9-based hydrocarbon resins, and any combinations or mixtures thereof. In another advantageous aspect, the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

In other exemplary aspects, tackifying resins which can be used are pinene resins and indene resins, and rosins, their disproportionated, hydrogenated, polymerized and esterified derivatives and salts, terpene resins and terpene-phenolic resins, and also C5 resins, C9 resins and other hydrocarbon resins. Combinations of these and further resins may also be used with advantage in order to adjust the properties of the resultant composition in accordance with what is desired. With particular preference it is possible to use all resins that are compatible (soluble) with the polyacrylate in question.

According to a particular execution of the process of the disclosure, the tackifying resin for use herein has a softening point greater than 105° C. Unless otherwise stated, the softening point of the tackifying resin is determined using a Ring-and-Ball Apparatus according to test method ASTM E28-14.

In a particular aspect, the tackifying resin for use herein has a softening point greater than 110° C., greater than 120° C., greater than 130° C. or even greater than 140° C., when determined according to test method ASTM E28-14.

In another particular aspect, the tackifying resin has a softening point greater than 105° C., greater than 110° C., greater than 120° C., greater than 130° C. or even greater than 140° C., when measured according to the test method ASTM E28-14.

In still another particular aspect, the hot melt processable pressure sensitive adhesive composition for use herein comprises a plurality of tackifying resins, wherein all the tackifying resins have a softening point greater than 105° C., greater than 110° C., greater than 120° C., greater than 130° C. or even greater than 140° C., when measured according to the test method ASTM E28-14.

According to yet another particular aspect, the hot melt processable pressure sensitive adhesive composition for use herein comprises a mixture of tackifying resins having a combined softening point, and wherein the combined softening point is greater than 105° C., greater than 110° C., greater than 120° C., greater than 130° C. or even greater than 140° C., when measured according to the test method ASTM E28-14.

In an advantageous aspect, the tackifying resin having a softening point greater than 105° C. is selected from the group of hydrocarbon tackifiers, in particular those selected from the group consisting of hydrogenated hydrocarbon tackifiers, hydrated hydrocarbon tackifiers, and any combinations or mixtures thereof. Advantageously still, the tackifying system comprises a tackifying resin having a softening point greater than 105° C. and which is selected from the group consisting of C5 or C9 resins, in particular hydrated C5 or C9 resins.

In an alternative aspect, the tackifying resin for use herein has a softening point no greater than 140° C., no greater than 130° C., no greater than 120° C., no greater than 110° C. or even no greater than 105° C., when measured according to the test method ASTM E28-14.

According to a beneficial aspect of the present disclosure, the tackifying resin for use herein is selected from the group of terpene-phenolic resins and rosin ester resins. Preferably, the tackifying resin for use herein is selected from the group of rosin ester resins.

In a particular execution, the tackifying system for us herein is free of terpene resins, in particular terpene phenolic resins.

The polymeric resin, in particular the tackifying resin for use herein may be present in the hot melt processable pressure sensitive adhesive composition in any suitable amounts, depending on the properties desired for the resulting pressure sensitive adhesive. In some exemplary aspects, the tackifying system may be present in the pressure sensitive adhesive composition in an amount from 20 wt % to 70 wt %, from 25 wt % to 60 wt %, or even from 25 wt % to 50 wt %, based on the weight of the hot melt processable pressure sensitive adhesive composition.

The hot melt processable pressure sensitive adhesive composition for use herein may further comprise, as an optional feature, at least one expandable microsphere. In a preferred aspect, the pressure sensitive adhesive composition comprises a plurality of expandable microspheres.

Any commonly known expandable microspheres may be used in the context of the present disclosure. Suitable expandable microspheres for use herein may be easily identified by those skilled in the art, in the light of the present disclosure.

Examples of suitable commercially available expandable microspheres for use herein include those available from Matsumoto Yushi-Seiyaku, Ltd., Osaka, Japan, under the designations "F30D", "F80SD" and "F100D". Also suitable are expandable polymeric microspheres available from Akzo-Nobel under the designations Expancel®, in particular "Expancel 551", "Expancel 461", "Expancel 091", "Expancel 092 DU 40" or even "Expancel 051 DU 40". Other suitable expandable microspheres are commercially available from Henkel under the designation Dualite®.

The optional expandable microspheres for use herein may be present in the hot melt processable pressure sensitive adhesive composition in any suitable amounts, depending on the properties desired for the resulting pressure sensitive adhesive. In some exemplary aspects, the expandable microspheres may be present in the hot melt processable pressure sensitive adhesive composition in an amount from 1 wt % to 20 wt %, from 3 wt % to 15 wt %, or even from 5 wt % to 15 wt %, based on the weight of the hot melt processable pressure sensitive adhesive composition.

The hot melt processable pressure sensitive adhesive composition according to the present disclosure may further comprise an optional filler material which is preferably selected from the group consisting of filler particles, in particular expanded perlite, microspheres, expendable and expanded microspheres, glassbeads, glass microspheres, silica type fillers, hydrophobic silica type fillers, hydrophilic silica type fillers, hydrophobic fumed silica, hydrophilic fumed silica, fibers, electrically and/or thermally conducting particles, nanoparticles, in particular silica nanoparticles, and any combinations or mixtures thereof. The disclosure is however not that limited as alternative filler material may be easily identified by those skilled in the art, in the light of the present disclosure. In a particular aspect, the filler material, in particular the particulate filler material comprises hollow glass microspheres. The filler material for use herein may be present in the (co)polymerizable material, in any suitable amounts, depending on the desired properties.

As will be apparent to those skilled in the art of formulating pressure sensitive adhesives, the pressure sensitive adhesive composition may further include one or more conventional, but optional additives depending on the envisaged properties for the resulting pressure sensitive adhesive. Exemplary additional additives include, but are not limited to, one or more plasticizers, UV stabilizers, antistatic agents, colorants, antioxidants, fungicides, bactericides, organic and/or inorganic filler particles, pigments, dyes and any combinations thereof. Advantageously, the additional additives for use herein are non-polymerizable additives.

According to a particular execution, the pressure sensitive adhesive composition according to the present disclosure comprises at least one pigment. Various commonly known pigments may be used in the context of the present disclosure. In a particular aspect, the pigment for use herein is a coloring pigments, in particular dark and black pigments, such as preferably carbon blacks.

When used, the pigment for use herein may be present in the hot melt processable pressure sensitive adhesive composition in any suitable amounts, depending on the properties desired for the resulting pressure sensitive adhesive. In an exemplary aspect, the pigment may be present in the hot melt processable pressure sensitive adhesive composition in an amount from 0.5 wt % to 20 wt %, from 1 wt % to 15 wt %, or even from 1 wt % to 10 wt %, based on the weight of the hot melt processable pressure sensitive adhesive composition.

According to a preferred aspect of the present disclosure, the hot melt processable pressure sensitive adhesive composition comprises:
  a) from 20 wt % to 80 wt %, from 20 wt % to 70 wt %, from 25 wt % to 60 wt %, or even from 25 wt % to 50 wt % of the (meth)acrylate copolymer component, based on the weight of the hot melt processable pressure sensitive adhesive composition;
  b) from 0.1 wt % to 10 wt %, from 0.1 wt % to 6 wt %, from 0.2 wt % to 5 wt %, or even from 0.2 wt % to 4 wt % of a crosslinking agent, in particular a thermal crosslinking system, based on the weight of the hot melt processable pressure sensitive adhesive composition;
  c) from 20 wt % to 70 wt %, from 25 wt % to 60 wt %, or even from 25 wt % to 50 wt % of the polymeric resin, in particular the tackifying resin, based on the weight of the hot melt processable pressure sensitive adhesive composition;

d) optionally, from 1 wt % to 20 wt %, from 3 wt % to 15 wt %, or even from 5 wt % to 15 wt % of the expandable microsphere, based on the weight of the hot melt processable pressure sensitive adhesive composition; and e) optionally, from 0.5 wt % to 20 wt %, from 1 wt % to 15 wt %, or even from 1 wt % to 10 wt % of pigments, based on the weight of the hot melt processable pressure sensitive adhesive composition.

According to the method of the present disclosure, the hot melt blend comprising in particular the hot melt processable pressure sensitive adhesive composition, is obtained by a solvent-free manufacturing method comprising a hotmelt processing step. Any hot melt processing method, well known to those skilled in the art, may be used in the context of the present disclosure.

A hot melt processing manufacturing method typically uses a hot melt mixing apparatus. Any hot melt mixing apparatus, well known to those skilled in the art of manufacturing pressure sensitive adhesive compositions, may be used in the context of the present disclosure.

According to one advantageous aspect, the hot melt mixing apparatus for use in the process according to the disclosure is selected from the group of single- and multi-screw extruders. More advantageously, the hot melt mixing apparatus for use herein is selected from the group consisting of single screw extruders, twin screw extruders, planetary roller extruders, and ring extruders.

Typical examples of hot melt mixing apparatus which may advantageously be used herein, include but are not limited to, co-rotating multi-screw extruders and counter-rotating multi-screw extruders.

According to one advantageous aspect, the hot melt mixing apparatus for use in the process according to the disclosure is a twin-screw extruder, in particular a co-rotating twin-screw extruder.

According to another advantageous aspect, the hot melt mixing apparatus for use in the process according to the disclosure is a planetary roller extruder comprising in particular a center spindle and multiple planetary gear spindles with center spindle and planetary gear spindles featuring a screw like geometry.

In a typical aspect of the present disclosure, the hot melt blend for use herein is an uncrosslinked curable precursor of a pressure sensitive adhesive. Typically still, the hot melt blend for use herein further comprises at least one of expandable microspheres, tackifying systems, plasticizers, pigments, stabilizers, and any mixtures thereof. Advantageously, the hot melt blend for use herein further comprises at least one expandable microsphere, and optionally, at least one pigment.

The process according to the present disclosure further comprises the step of subjecting the polymeric resin to a heating step (thereby at least partly remove low Volatile Organic Compounds (VOC) from the polymeric resin) thereby forming a (pre-)cleaned polymeric resin. The step of subjecting the polymeric resin to a heating step for use in the process of the present disclosure is not particularly limited.

According to a typical aspect, the step of subjecting the polymeric resin to a heating step (thermal treatment) is performed by subjecting the polymeric resin to any of thermal heating, radiation heating, convection heating, induction heating, ultrasonic vibration heating, and any combinations thereof.

According to an advantageous aspect of the present disclosure, the step of subjecting the polymeric resin to a heating step is performed by subjecting the polymeric resin to any of thermal heating, radiation heating, and any combinations thereof.

In a preferred aspect of the process, the step of subjecting the polymeric resin to a heating step is performed in a feeding equipment for polymeric resins. Advantageously, the polymeric resin feeding equipment is associated/connected with the hot melt mixing apparatus. Any feeding equipment for polymeric resins, well known to those skilled in the art, may be used in the context of the present disclosure. In a typical aspect of the process, the feeding equipment for use herein is a grid melter.

In a beneficial aspect of the process, the hot melt mixing apparatus for use herein is selected from a planetary roller extruder or a multi screw extruder.

According to another advantageous aspect of the present disclosure, the step of subjecting the polymeric resin to a heating step is performed in a distillation or evaporation equipment, in particular in a Wiped Film Evaporator.

According to still another advantageous aspect of the process according to this disclosure, the step of subjecting the polymeric resin to a heating step is performed in combination with a step of applying vacuum to the heated polymeric resin.

Advantageously, the step of subjecting the polymeric resin to a heating step is performed at a temperature in a range from 90° C. to 300° C., from 110° C. to 280° C., from 110° C. to 250° C., from 110° C. to 220° C., from 130° C. to 200° C., or even from 150° C. to 180° C.

Advantageously still, the step of subjecting the polymeric resin to a heating step is performed at a pressure in a range from 0.05 mbar to 2000 mbar, from 0.1 mbar to 1500 mbar, or even from 0.1 mbar to 1000 mbar.

According to one advantageous aspect of the process according to the disclosure, the steps of: (a) subjecting the polymeric resin to a heating step (thereby at least partly remove low Volatile Organic Compounds (VOC) from the polymeric resin) thereby forming a (pre-)cleaned polymeric resin; (b) incorporating the (pre-)cleaned polymeric resin and the hot melt processable pressure sensitive adhesive composition in the hot melt mixing apparatus; and (c) mixing the hot melt processable pressure sensitive adhesive composition and the (pre-)cleaned polymeric resin in the hot melt mixing apparatus thereby forming a hot melt blend; are performed according to a continuous hotmelt (mixing) processing step. In a particular aspect of the method, the continuous hotmelt extrusion processing step is performed in particular in a single- or twin screw hotmelt extrusion processing step, a planetary roller hotmelt extrusion step or in a ring extruder hotmelt extrusion step.

According to another aspect of the process according to the disclosure, the steps of: (a) subjecting the polymeric resin to a heating step (thereby at least partly remove low Volatile Organic Compounds (VOC) from the polymeric resin) thereby forming a (pre-)cleaned polymeric resin; (b) incorporating the (pre-)cleaned polymeric resin and the hot melt processable pressure sensitive adhesive composition in the hot melt mixing apparatus; and (c) mixing the hot melt processable pressure sensitive adhesive composition and the (pre-)cleaned polymeric resin in the hot melt mixing apparatus thereby forming a hot melt blend; are performed according to a discontinuous hotmelt (mixing) processing step. In a particular aspect of the method, the discontinous hotmelt extrusion processing step is performed in particular in a single- or twin screw hotmelt extrusion processing step, a planetary roller hotmelt extrusion step or in a ring extruder hotmelt extrusion step.

The process according to the present disclosure may further comprise the optional step of crosslinking the hot melt blend. Crosslinking methods for use herein will be typically selected from the group of thermal crosslinking, actinic radiation crosslinking, and any combinations thereof.

According to one advantageous aspect of the process, the crosslinking step is performed by thermal crosslinking.

In a particular aspect of the process, the step of thermally crosslinking the hot melt blend is performed by subjecting the hot melt blend to any of thermal heating, radiation heating, convection heating, induction heating, ultrasonic vibration heating, and any combinations thereof.

In an advantageous aspect of the process, the step of thermally crosslinking the hot melt blend is performed by subjecting the hot melt blend to any of thermal heating, radiation heating, convection heating, and any combinations thereof.

According to one particular aspect, the process according to the present disclosure may further comprise the optional step of allowing the expansion of the expandable microspheres, in particular allowing the expansion of the expandable microspheres such that the expansion of the expandable microspheres occurs only after departure from hot melt mixing apparatus, in particular simultaneously with cooling of the hot melt blend.

According to another particular aspect, the process according to the present disclosure may further comprise the optional step of allowing the expansion of the expandable microspheres, in particular allowing the expansion of the expandable microspheres such that the expansion of the expandable microspheres occurs only after departure from hot melt mixing apparatus, in particular simultaneously with the thermal crosslinking of the hot melt.

The process according to the present disclosure further comprises the step of removing the hot melt blend from the hot melt mixing apparatus. In a particular aspect of the process, the step of removing the hot melt blend from the hot melt mixing apparatus comprises hot melt coating the hot melt blend on a substrate, as well known to those skilled in the art.

According to an advantageous aspect of the present disclosure, the process further comprises the step of shaping the hot melt blend after departure from hot melt mixing apparatus to a layer, preferably in a shaping assembly, in particular a roll applicator or a calendar.

According to an advantageous aspect of the process according to the present disclosure, the hot melt blend for use herein has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermal desorption analysis according to test method VDA278.

According to another advantageous aspect of the process, the hot melt blend for use herein has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermogravimetric analysis according to the weight loss test method described in the experimental section.

According to still another advantageous aspect of the process, the hot melt blend for use herein has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

According to yet another advantageous aspect of the process, the hot melt blend for use herein has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermogravimetric analysis according to the weight loss test method described in the experimental section.

According to another aspect, the present disclosure relates to a pressure sensitive adhesive comprising a hot melt processable pressure sensitive adhesive composition and a crosslinking system as described above, and wherein the pressure sensitive adhesive has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermal desorption analysis according to test method VDA278.

In one advantageous aspect, the pressure sensitive adhesive of the present disclosure has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermogravimetric analysis according to the weight loss test method described in the experimental section.

In another advantageous aspect, the pressure sensitive adhesive of the present disclosure has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

In yet another advantageous aspect, the pressure sensitive adhesive of the present disclosure has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

According to one advantageous aspect of the present disclosure, the pressure sensitive adhesive is crosslinked by a crosslinking process, in particular a thermal crosslinking process or an actinic radiation crosslinking process. More advantageously, the pressure sensitive adhesive of the present disclosure is crosslinked by a thermal crosslinking process.

According to another aspect, the present disclosure is directed to a crosslinked pressure sensitive adhesive which is obtained by a process as described above.

In still another aspect, the present disclosure relates to a pressure sensitive adhesive assembly comprising a first pressure sensitive adhesive layer, wherein the first pressure sensitive adhesive layer comprises a pressure sensitive adhesive or a crosslinked pressure sensitive adhesive as above described.

In a particular execution of the pressure sensitive adhesive assembly, the first pressure sensitive adhesive foam takes the form of a polymeric foam layer.

In the context of the present disclosure, the term "polymeric foam" is meant to designate a material based on a polymer and which material comprises voids, typically in an amount of at least 5% by volume, typically from 10% to 55% by volume or from 10% to 45% by volume. The voids may result from the incorporation of hollow fillers, such as hollow polymeric particles, hollow glass microspheres or hollow ceramic microspheres. Advantageously, the voids may result from the presence of the expandable microspheres.

A polymeric foam layer for use herein has for example a thickness comprised between 100 and 6000 micrometers, between 200 and 4000 micrometers, between 500 and 2000 micrometers, or even between 800 and 1500 micrometers. As will be apparent to those skilled in the art, in the light of the present description, the preferred thickness of the polymeric foam layer will be dependent on the intended application.

A polymeric foam layer typically has a density comprised between 0.30 g/cm$^3$ and 1.5 g/cm$^3$, between 0.45 g/cm$^3$ and 1.10 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

In a particular aspect of the present disclosure, the pressure sensitive adhesive assembly further comprises a second pressure sensitive adhesive layer adjacent to the first pressure sensitive adhesive layer.

In a particular execution, the pressure sensitive adhesive assembly according to the present disclosure takes the form of skin/core type multilayer pressure sensitive adhesive assembly, wherein the first pressure sensitive adhesive foam layer is the core layer of the multilayer pressure sensitive adhesive assembly and the second pressure sensitive adhesive layer is the skin layer of the multilayer pressure sensitive adhesive assembly. This particular execution is commonly referred to as a dual layer polymeric foam tape assembly. According this specific execution, it is preferred that the second pressure sensitive adhesive layer has a lower thickness compared to the polymeric foam core layer. As a way of example, the thickness of the skin layer may typically be in the range from 20 micrometers to 250 micrometers, or even from 40 micrometers to 200 micrometers, whereas the thickness of the polymeric foam core layer may typically be in the range from 100 micrometers to 6000 micrometers, from 400 micrometers to 3000 micrometers, or even from 800 micrometers to 2000 micrometers. However, the thickness of the various layer(s) comprised in the pressure sensitive adhesive assembly may vary in wide ranges depending on the desired execution and associated properties. By way of example, the thickness can be independently chosen for each layer between 25 micrometers and 6000 micrometers, between 40 micrometers and 3000 micrometers, between 50 micrometers and 3000 micrometers, between 75 micrometers and 2000 micrometers, or even between 75 micrometers and 1500 micrometers.

Multilayer pressure sensitive adhesive assemblies according to the present disclosure, and in particular dual layer polymeric foam tape assemblies, are particularly advantageous when compared to single-layer pressure sensitive adhesives, in that adhesion (quick adhesion) can be adjusted by the formulation of the second pressure sensitive adhesive layer (also commonly referred to as the skin layer), while other properties/requirements of the overall assembly such as application issues, deforming issues and energy distribution may be addressed by appropriate formulation of the polymeric foam layer (also commonly referred to as the core layer). In some aspects, the multilayer pressure sensitive adhesive assemblies as disclosed herein are smooth, homogenous and consist of layers which are chemically bond to each other, without any delamination occurring. Alternatively, the layers of the multilayer pressure sensitive adhesive assemblies may be adhered to each other by suitable physical surface treatments such as e.g. corona or plasma treatment or chemical surface treatment such as use of primer compositions. Those surface treatment techniques are well known to those skilled in the art.

In some aspects, it may be advantageous for the multilayer pressure sensitive adhesive assemblies of the present disclosure to further comprise a third pressure sensitive adhesive layer which is preferably adjacent to the first pressure sensitive adhesive layer in the side of the first pressure sensitive adhesive layer which is opposed to the side of the first pressure sensitive adhesive layer adjacent to the second pressure sensitive adhesive layer, and thereby forming a three-layered multilayer pressure sensitive adhesive assembly.

Three-layered multilayer pressure sensitive adhesive assemblies according to one aspect of the disclosure, may advantageously take the form of a skin/core/skin multilayer pressure sensitive adhesive assembly, wherein the first pressure sensitive adhesive layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

The first pressure sensitive adhesive layer and/or the second pressure sensitive adhesive layer and/or the third pressure sensitive adhesive layer may have any composition commonly known in the art. As such, the composition of these various layers for use in the multilayer pressure sensitive adhesive assemblies of the present disclosure is not particularly limited.

In a particular aspect, the first pressure sensitive adhesive layer and/or the second pressure sensitive adhesive layer and/or the third pressure sensitive adhesive layer comprise a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

In a typical aspect, the first pressure sensitive adhesive layer and/or the second pressure sensitive adhesive layer and/or the third pressure sensitive adhesive layer comprise a polymer base material selected from the group consisting of polyacrylates, polyurethanes, and any combinations, copolymers or mixtures thereof. According to another typical aspect, the first pressure sensitive adhesive layer and/or the second pressure sensitive adhesive layer and/or the third pressure sensitive adhesive layer comprise a polymer base material selected from the group consisting of polyacrylates, and any combinations, copolymers or mixtures thereof.

According to a preferred aspect of the pressure sensitive adhesive assemblies of the present disclosure, the first pressure sensitive adhesive layer and/or the second pressure sensitive adhesive layer and/or the third pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

The pressure sensitive adhesive assembly of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The pressure sensitive adhesive assemblies of the present disclosure may be used in any article conventionally known to use such assemblies such as labels, tapes, signs, covers, marking indices, display components, touch panels, and the like. Flexible backing materials having microreplicated surfaces are also contemplated.

The pressure sensitive adhesive assembly may be coated/applied on a substrate using any conventional coating techniques modified as appropriate to the particular substrate. For example, pressure sensitive adhesive assemblies may be applied/coated to a variety of solid substrates by methods such as roller coating, flow coating, dip coating, spin coating, spray coating knife coating, and die coating. These various methods of coating allow the pressure sensitive adhesive assemblies to be placed on the substrate at variable thicknesses thus allowing a wider range of use of the assemblies.

In still another aspect, the present invention relates to the use of a pressure sensitive adhesive or a crosslinked pressure sensitive adhesive or a pressure sensitive adhesive assembly as described above for industrial applications.

In yet another aspect, the present invention relates to the use of a pressure sensitive adhesive or a crosslinked pressure sensitive adhesive or a pressure sensitive adhesive assembly as described above for interior applications, in particular for construction market applications and transportation market applications, in particular automotive and aerospace applications, more in particular for taped seal on body, taped seal on door, exterior and interior parts attachment and weatherstrip tape applications for the automotive industry.

In yet another aspect, the present invention relates to the use of a pressure sensitive adhesive or a crosslinked pressure sensitive adhesive or a pressure sensitive adhesive assembly as described above for electronic applications, in particular for the fixation of display panels in mobile hand held electronic devices.

In yet another aspect, the present invention relates to the use of a pressure sensitive adhesive or a crosslinked pressure sensitive adhesive or a pressure sensitive adhesive assembly as described above for the bonding to a low surface energy substrate and/or a medium surface energy substrate, in particular automotive clear coats/paints.

Item 1 is a (continuous) process of manufacturing a pressure sensitive adhesive, comprising the steps of:
  a) providing a hot melt mixing apparatus comprising a reaction chamber;
  b) providing a hot melt processable pressure sensitive adhesive composition comprising:
    (1) a (meth)acrylate copolymer component comprising:
      i. $C_1$-$C_{32}$ (meth)acrylic acid ester monomer units;
      ii. optionally, ethylenically unsaturated monomer units having functional groups selected from the group consisting of acid, hydroxyl, acid anhydride, epoxide, amine, amide groups, and any combinations thereof; and
      iii. optionally, further ethylenically unsaturated monomer units which are copolymerizable with monomer units (i) and/or (ii); and
    (2) a crosslinking system selected from the group consisting of thermal crosslinking systems, actinic radiation crosslinking systems, and any combinations thereof;
    (3) optionally, at least one expandable microsphere; and
    (4) optionally, at least one pigment;
  c) providing a polymeric resin;
  d) subjecting the polymeric resin to a heating step (thereby at least partly remove low Volatile Organic Compounds (VOC) from the polymeric resin) thereby forming a (pre-)cleaned polymeric resin;
  e) incorporating the (pre-)cleaned polymeric resin and the hot melt processable pressure sensitive adhesive composition in the reaction chamber of the hot melt mixing apparatus;
  f) mixing the hot melt processable pressure sensitive adhesive composition and the (pre-)cleaned polymeric resin in the hot melt mixing apparatus thereby forming a hot melt blend;
  g) removing the hot melt blend from the hot melt mixing apparatus; and
  h) optionally, crosslinking the hot melt blend.

Item 2 is a process according to item 1, wherein the hot melt blend has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermal desorption analysis according to test method VDA278.

Item 3 is a process according to any of item 1 or 2, wherein the hot melt blend has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermogravimetric analysis according to the weight loss test method described in the experimental section.

Item 4 is a process according to any of the preceding items, wherein the hot melt blend has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

Item 5 is a process according to any of the preceding items, wherein the hot melt blend has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermogravimetric analysis according to the weight loss test method described in the experimental section.

Item 6 is a process according to any of the preceding items, wherein the hot melt blend is an uncrosslinked curable precursor of a pressure sensitive adhesive.

Item 7 is a process according to any of the preceding items, wherein the hot melt blend further comprises at least one of expandable microspheres, tackifying systems, plasticizers, pigments, stabilizers, and any mixtures thereof.

Item 8 is a process according to any of the preceding items, wherein the hot melt blend further comprises at least one expandable microsphere, and optionally, at least one pigment.

Item 9 is a process according to any of the preceding items, wherein the hot melt processable (uncrosslinked curable precursor of a) pressure sensitive adhesive composition is obtained by a manufacturing process comprising any of solvent-based polymerization steps, solvent concentration steps, solvent stripping-off steps, solvent recycling steps, steam distillation steps, solvent distillation steps, and any combinations thereof.

Item 10 is a process according to any of items 1 to 8, wherein the hot melt processable (uncrosslinked curable precursor of a) pressure sensitive adhesive composition is obtained by a solvent-free manufacturing method.

Item 11 is a process according to any of items 1 to 10, wherein the hot melt processable (uncrosslinked curable precursor of a) pressure sensitive adhesive composition is obtained by a manufacturing process, which is free of any of devolatilization steps, degassing steps, in particular using entrainers or vacuum, solvent concentration steps, solvent stripping-off steps, solvent recycling steps, steam distillation steps, solvent distillation steps, and any combinations thereof.

Item 12 is a process according to any of items 1 to 10, wherein the hot melt processable (uncrosslinked curable precursor of a) pressure sensitive adhesive composition is further subjected to any of devolatilization steps or melt degassing steps, in particular using entrainers or vacuum, VOC scavengers, distillation steps, solvent distillation steps, and any combinations thereof.

Item 13 is a process according to any of the preceding items, wherein the step of removing the hot melt blend from the hot melt mixing apparatus comprises hot melt coating the hot melt blend on a substrate.

Item 14 is a process according to any of the preceding items, wherein the steps of: (a) subjecting the polymeric resin to a heating step (thereby at least partly remove low Volatile Organic Compounds (VOC) from the polymeric resin) thereby forming a (pre-)cleaned polymeric resin; (b) incorporating the (pre-)cleaned polymeric resin and the hot melt processable pressure sensitive adhesive composition in the hot melt mixing apparatus; and (c) mixing the hot melt processable pressure sensitive adhesive composition and the (pre-)cleaned polymeric resin in the hot melt mixing apparatus thereby forming a hot melt blend; are performed according to a continuous hotmelt (mixing) processing step, in particular a hotmelt extrusion processing step, more in particular a single- or twin screw hotmelt extrusion processing step, a planetary roller hotmelt extrusion step or a ring extruder hotmelt extrusion step.

Item 15 is a process according to item 14 with the exception that the step of subjecting the polymeric resin to a heating step (thereby at least partly remove low Volatile Organic Compounds (VOC) from the polymeric resin) thereby forming a (pre-)cleaned polymeric resin, is performed according to a discontinuous hotmelt (mixing) processing step, in particular according to a process whereby that the step of subjecting the polymeric resin to a heating step (thereby at least partly remove low Volatile Organic Compounds (VOC) from the polymeric resin) is performed discontinuously when compared to the continuous hotmelt (mixing) processing step.

Item 16 is a process according to any of the preceding items, wherein the hot melt mixing apparatus is selected from the group of single- and multi-screw extruders.

Item 17 is a process according to any of the preceding items, wherein the hot melt mixing apparatus is selected from the group consisting of single screw extruders, twin screw extruders, planetary roller extruders, and ring extruders.

Item 18 is a process according to any of the preceding items, wherein the hot melt mixing apparatus is selected from the group consisting of co-rotating multi-screw extruders, counter-rotating multi-screw extruders.

Item 19 is a process according to any of the preceding items, wherein the hot melt mixing apparatus is a twin-screw extruder, in particular a co-rotating twin-screw extruder.

Item 20 is a process according to any of items 1 to 19, wherein the hot melt mixing apparatus is a planetary roller extruder comprising in particular a center spindle and multiple planetary gear spindles with center spindle and planetary gear spindles featuring a screw like geometry.

Item 21 is a process according to any of the preceding items, wherein the $C_1$-$C_{32}$ (meth)acrylic acid ester monomer units are selected from the group of $C_1$-$C_{25}$ (meth)acrylic acid ester monomer units, $C_1$-$C_{20}$ (meth)acrylic acid ester monomer units, $C_1$-$C_{18}$ (meth)acrylic acid ester monomer units, $C_2$-$C_{16}$ (meth)acrylic acid ester monomer units, $C_2$-$C_{14}$ (meth)acrylic acid ester monomer units, or even $C_2$-$C_{14}$ (meth)acrylic acid ester monomer units.

Item 22 is a process according to any of the preceding items, wherein the $C_1$-$C_{32}$ (meth)acrylic acid ester monomer units are selected from the group of $C_4$-$C_{30}$ (meth)acrylic acid ester monomer units, $C_4$-$C_{14}$ (meth)acrylic acid ester monomer units, or even from the group of $C_4$-$C_9$ (meth)acrylic acid ester monomer units.

Item 23 is a process according to any of the preceding items, wherein the $C_1$-$C_{32}$ (meth)acrylic acid ester monomer units are selected from the group consisting of $C_4$-$C_9$ (meth)acrylic acid ester monomer units, preferably from the group consisting of n-butyl acrylate, n-butyl methacrylate, n-pentyl acrylate, n-pentyl methacrylate, n-amyl acrylate, n-hexyl acrylate, hexyl methacrylate, n-heptyl (meth)acrylate, n-octyl acrylate, n-octyl methacrylate, n-nonyl (meth)acrylate, isobutyl (meth)acrylate, isooctyl acrylate, isooctyl methacrylate, 2-ethylhexyl acrylate, 2-ethylhexyl methacrylate, 2-octyl acrylate, and any combinations or mixtures thereof.

Item 24 is a process according to any of the preceding items, wherein the $C_1$-$C_{32}$ (meth)acrylic acid ester monomer units are selected from the group consisting of $C_{10}$-$C_{30}$ (meth)acrylic acid ester monomer units, preferably from the group consisting of propylheptyl (meth)acrylate, (meth)acrylic acid esters of 2-alkyl alkanols, in particular (meth)acrylic acid esters derived from a $C_{12}$-$C_{30}$ 2-alkyl alkanol and any combinations or mixtures thereof.

Item 25 is a process according to any of the preceding items, wherein the $C_1$-$C_{32}$ (meth)acrylic acid ester monomer units are selected from the group consisting of isooctyl acrylate, 2-ethylhexyl acrylate, and any combinations or mixtures thereof.

Item 26 is a process according to any of the preceding items, wherein the optional ethylenically unsaturated monomer units having functional groups are selected from the group of ethylenically unsaturated monomer units having functional groups selected from the group consisting of carboxyl, sulphonic acid, phosphonic acid, hydroxyl, acid anhydride, epoxide, amine, amide groups, and any combinations thereof.

Item 27 is a process according to any of the preceding items, wherein the optional ethylenically unsaturated monomer units having functional groups are selected from the group of ethylenically unsaturated monomer units having functional groups selected from the group consisting of carboxyl, hydroxyl, and any combinations thereof.

Item 28 is a process according to any of the preceding items, wherein the optional ethylenically unsaturated monomer units having functional groups are selected from the group consisting of acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, and any combinations or mixtures thereof.

Item 29 is a process according to any of the preceding items, wherein the optional ethylenically unsaturated monomer units having functional groups are selected from the group of acrylic acid monomers.

Item 30 is a process according to any of the preceding items, wherein the optional further ethylenically unsaturated monomer units which are copolymerizable with monomer units (i) and/or (ii) are selected from the group consisting of methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, and any combinations or mixtures thereof.

Item 31 is a process according to any of the preceding items, wherein the optional further ethylenically unsaturated monomer units which are copolymerizable with monomer units (i) and/or (ii) are selected from the group consisting of methyl acrylate, ethyl acrylate, isobornyl acrylate, and any combinations or mixtures thereof.

Item 32 is a process according to any of the preceding items, wherein the crosslinking system is an actinic radiation crosslinking system, in particular a UV or e-beam crosslinking system, comprising in particular multifunctional (meth)acrylate compounds.

Item 33 is a process according to any of items 1 to 32, wherein the crosslinking system is a thermal crosslinking system comprising a thermal crosslinker and optionally, a crosslinking accelerator.

Item 34 is a process according to item 33, wherein the thermal crosslinker is selected from the group of compounds comprising functional groups selected from the group consisting of epoxide, oxazoline, oxetane, blocked or non-blocked isocyanates, and any combinations or mixtures thereof.

Item 35 is a process according to any of item 33 or 34, wherein the crosslinking accelerator is selected from the group consisting of amines, amides, ureas, polyamines, polyamides, polyureas, functional amines and polyamines, functional amides and polyamides, polyfunctional amines and polyamines, polyfunctional amides and polyamides, and any combinations or mixtures thereof.

Item 36 is a process according to any of the preceding items, wherein the hot melt blend is substantially free of actinic-radiation crosslinking agents, in particular free of UV crosslinking agents.

Item 37 is a process according to any of the preceding items, wherein the polymeric resin is selected from the group consisting of tackifying resins, plasticizing resins, and any combinations or mixtures thereof.

Item 38 is a process according to any of the preceding items, wherein the polymeric resin is a tackifying resin.

Item 39 is a process according to item 38, wherein the tackifying resin has a softening point greater than 105° C., greater than 110° C., greater than 120° C., greater than 130° C. or even greater than 140° C., when measured according to the test method ASTM E28-14.

Item 40 is a process according to any of item 38 or 39, wherein the hot melt processable pressure sensitive adhesive composition comprises a plurality of tackifying resins, wherein all the tackifying resins have a softening point greater than 105° C., greater than 110° C., greater than 120° C., greater than 130° C. or even greater than 140° C., when measured according to the test method ASTM E28-14.

Item 41 is a process according to any of items 38 to 40, wherein the hot melt processable pressure sensitive adhesive composition comprises a mixture of tackifying resins having a combined softening point, and wherein the combined softening point is greater than 105° C., greater than 110° C., greater than 120° C., greater than 130° C. or even greater than 140° C., when measured according to the test method described ASTM E28-14.

Item 42 is process according to any of items 38 to 41, wherein the tackifying resin is selected from the group of hydrocarbon tackifiers, in particular those selected from the group consisting of hydrogenated hydrocarbon tackifiers, hydrated hydrocarbon tackifiers, and any combinations or mixtures thereof.

Item 43 is a process according to any of items 38 to 42, wherein the tackifying resin is selected from the group consisting of C5 or C9 resins, in particular hydrated C5 or C9 resins.

Item 44 is a process according to item 38, wherein the tackifying resin has a softening point no greater than 140° C., no greater than 130° C., no greater than 120° C., no greater than 110° C. or even no greater than 105° C., when measured according to the test method ASTM E28-14.

Item 45 is a process according to any of items 38 to 44, wherein the tackifying resin is selected from the group of rosin ester resins. Item 46 is a process according to any of items 38 to 45, wherein the tackifying resin is free of terpene resins, in particular terpene phenolic resins.

Item 47 is a process according to any of the preceding items, wherein the optional pigment is selected from the group of dark, in particular black pigments.

Item 48 is a process according to any of the preceding items, wherein the hot melt processable pressure sensitive adhesive composition comprises:
  a) from 20 wt % to 80 wt %, from 20 wt % to 70 wt %, from 25 wt % to 60 wt %, or even from 25 wt % to 50 wt % of the (meth)acrylate (co)polymer component, based on the weight of the hot melt processable pressure sensitive adhesive composition;

b) from 0.1 wt % to 10 wt %, from 0.1 wt % to 6 wt %, from 0.2 wt % to 5 wt %, or even from 0.2 wt % to 4 wt % of a crosslinking agent, in particular a thermal crosslinking system, based on the weight of the hot melt processable pressure sensitive adhesive composition;

c) from 20 wt % to 70 wt %, from 25 wt % to 60 wt %, or even from 25 wt % to 50 wt % of the polymeric resin, in particular the tackifying resin, based on the weight of the hot melt processable pressure sensitive adhesive composition;

d) optionally, from 1 wt % to 20 wt %, from 3 wt % to 15 wt %, or even from 5 wt % to 15 wt % of the expandable microsphere, based on the weight of the hot melt processable pressure sensitive adhesive composition; and e) optionally, from 0.5 wt % to 20 wt %, from 1 wt % to 15 wt %, or even from 1 wt % to 10 wt % of pigments, based on the weight of the hot melt processable pressure sensitive adhesive composition.

Item 49 is a process according to any of the preceding items, wherein the (meth)acrylate (co)polymer component comprises:

a) from 45 wt % to 99 wt % of $C_1$-$C_{32}$ (meth)acrylic acid ester monomer units, based on the weight of the (meth)acrylate (co)polymer component;

b) optionally, from 1 wt % to 15 wt % of ethylenically unsaturated monomer units having functional groups, based on the weight of the (meth)acrylate (co)polymer component; and c) optionally, from 0 wt % to 40 wt % of further ethylenically unsaturated polar monomer units which are copolymerizable with monomer units (a) and/or (b), based on the weight of the (meth)acrylate (co)polymer component.

Item 50 is a process according to any of the preceding items, wherein the hot melt processable pressure sensitive adhesive composition is contained within a packaging material and forms a packaged pressure sensitive adhesive composition prior to the step of incorporating the hot melt processable pressure sensitive adhesive composition in the hot melt mixing apparatus.

Item 51 is a process according to item 50, which comprises the step of combining the hot melt processable pressure sensitive adhesive composition with the packaging material by (completely) surrounding the hot melt processable pressure sensitive adhesive composition with the packaging material to form the packaged pressure sensitive adhesive composition.

Item 52 is a process according to any of item 50 or 51, wherein the packaged hot melt adhesive composition is in the form of a pouch, in particular a thermoplastic pouch.

Item 53 is a process according to any of items 50 to 52, wherein the packaging material comprises a base material, in particular a polymer base material, having a melting point of no greater than 200° C., no greater than 180° C., or even no greater than 160° C.

Item 54 is a process according to any of items 50 to 53, wherein the packaging material comprises a base material, in particular a polymer base material, having a melting point in a range from 90° C. to 150° C.

Item 55 is a process according to any of items 50 to 54, wherein the packaging material comprises a base material, in particular a thermoplastic polymer base material, which is typically selected from the group consisting of ethylene-vinyl acetate, ethylene-acrylic acid, polypropylene, polyethylene, polybutadiene, ionic films, and any combinations or mixtures thereof.

Item 56 is a process according to item 55, wherein the packaging material comprises a thermoplastic polymer base material selected from the group consisting of ethylene-vinyl acetate, ethylene-acrylic acid, and any combinations or mixtures thereof.

Item 57 is a process according to any of the preceding items, wherein the step of subjecting the polymeric resin to a heating step (thermal treatment) is performed by subjecting the polymeric resin to any of thermal heating, radiation heating, convection heating, induction heating, ultrasonic vibration heating, and any combinations thereof.

Item 58 is a process according to any of the preceding items, wherein the step of subjecting the polymeric resin to a heating step is performed by subjecting the polymeric resin to any of thermal heating, radiation heating, and any combinations thereof.

Item 59 is a process according to any of the preceding items, wherein the step of subjecting the polymeric resin to a heating step is performed in a feeding equipment for polymeric resins associated with the hot melt mixing apparatus, in particular a multi- or single screw extruder or a planetary roller extruder.

Item 60 is a process according to item 59, wherein the feeding equipment is a grid melter.

Item 61 is a process according to item 59, wherein the hot melt mixing apparatus is selected from a planetary roller extruder or a multi screw extruder.

Item 62 is a process according to any of items 1 to 59, wherein the step of subjecting the polymeric resin to a heating step is performed in a distillation or evaporation equipment, in particular in a Wiped Film Evaporator.

Item 63 is a process according to any of the preceding items, wherein the step of subjecting the polymeric resin to a heating step is performed in combination with a step of applying vacuum.

Item 64 is a process according to any of the preceding items, wherein the step of subjecting the polymeric resin to a heating step is performed at a temperature in a range from 90° C. to 300° C., from 110° C. to 280° C., from 110° C. to 250° C., from 110° C. to 220° C., from 130° C. to 200° C., or even from 150° C. to 180° C.

Item 65 is a process according to any of the preceding items, wherein the step of subjecting the polymeric resin to a heating step is performed at a pressure in a range from 0.05 mbar to 2000 mbar, from 0.1 mbar to 1500 mbar, or even from 0.1 mbar to 1000 mbar.

Item 66 is a process according to any of the preceding items, which further comprises the step of crosslinking the hot melt blend, in particular thermally crosslinking or actinic radiation crosslinking.

Item 67 is a process according to any of the preceding items, wherein the step of thermally crosslinking the hot melt blend is performed by subjecting the hot melt blend to any of thermal heating, radiation heating, convection heating, induction heating, ultrasonic vibration heating, and any combinations thereof.

Item 68 is a process according to any of the preceding items, wherein the step of thermally crosslinking the hot melt blend is performed by subjecting the hot melt blend to any of thermal heating, radiation heating, convection heating, and any combinations thereof.

Item 69 is a process according to any of the preceding items, which further comprises the step of allowing the expansion of the expandable microspheres, in particular allowing the expansion of the expandable microspheres such that the expansion of the expandable microspheres occurs only after departure from hot melt mixing apparatus, in particular simultaneously with cooling of the hot melt blend.

Item 70 is a process according to any of items 1 to 68, which further comprises the step of allowing the expansion of the expandable microspheres, in particular allowing the expansion of the expandable microspheres such that the expansion of the expandable microspheres occurs only after departure from hot melt mixing apparatus, in particular simultaneously with the thermal crosslinking of the hot melt.

Item 71 is a process according to any of item 69 or 70, which further comprises the step of shaping the hot melt blend after departure from hot melt mixing apparatus to a layer, preferably in a shaping assembly, in particular a roll applicator or a calendar.

Item 72 is a pressure sensitive adhesive comprising a hot melt processable pressure sensitive adhesive composition and a crosslinking system as described in any of the preceding items, and wherein the pressure sensitive adhesive has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermal desorption analysis according to test method VDA278.

Item 73 is a pressure sensitive adhesive according to item 72, which has a Volatile Organic Compound (VOC) value of less than 1500 ppm, less than 1200 ppm, less than 1000 ppm, less than 800 ppm, less than 600 ppm, less than 500 ppm, less than 400 ppm, or even less than 300 ppm, when measured by thermogravimetric analysis according to the weight loss test method described in the experimental section.

Item 74 is a pressure sensitive adhesive according to any of item 72 or 73, which has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

Item 75 is a pressure sensitive adhesive according to any of items 72 to 74, which has a Volatile Fogging Compound (FOG) value of less than 4000 ppm, less than 3000 ppm, less than 2500 ppm, less than 2000 ppm, less than 1500 ppm, less than 1000 ppm, less than 800 ppm, less than 600 ppm, less than 500 ppm, or even less than 400 ppm, when measured by thermal desorption analysis according to test method VDA278.

Item 76 is a pressure sensitive adhesive according to any of items 72 to 75, which is crosslinked by a crosslinking process, in particular a thermal crosslinking process or an actinic radiation crosslinking process.

Item 77 is a crosslinked pressure sensitive adhesive according to item 76, which is obtained by a process according to any of items 66 to 71.

Item 78 is a pressure sensitive adhesive assembly comprising a first pressure sensitive adhesive layer, wherein the first pressure sensitive adhesive layer comprises a pressure sensitive adhesive according to any of items 72 to 75 or a crosslinked pressure sensitive adhesive according to any of item 76 or 77.

Item 79 is a pressure sensitive adhesive assembly according to item 78, wherein the first pressure sensitive adhesive foam takes the form of a polymeric foam layer.

Item 80 is a pressure sensitive adhesive assembly according to any of item 78 or 79, which further comprises a second pressure sensitive adhesive layer adjacent to the first pressure sensitive adhesive layer.

Item 81 is a pressure sensitive adhesive assembly according to any of items 78 to 80, which is in the form of a skin/core multilayer pressure sensitive adhesive assembly, wherein the first pressure sensitive adhesive foam layer is the core layer of the multilayer pressure sensitive adhesive assembly and the second pressure sensitive adhesive layer is the skin layer of the multilayer pressure sensitive adhesive assembly.

Item 82 is a pressure sensitive adhesive assembly according to any of item 80 or 81, which further comprises a third pressure sensitive adhesive layer which is preferably adjacent to the first pressure sensitive adhesive layer in the side of the first pressure sensitive adhesive layer which is opposed to the side of the first pressure sensitive adhesive layer adjacent to the second pressure sensitive adhesive layer.

Item 83 is a pressure sensitive adhesive assembly according to item 82, which is in the form of a skin/core/skin multilayer pressure sensitive adhesive assembly, wherein the first pressure sensitive adhesive layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

Item 84 is the use of a pressure sensitive adhesive according to any of items 72 to 75 or a crosslinked pressure sensitive adhesive according to item 76 or 77 or a pressure sensitive adhesive assembly according to any of items 77 to 82 for industrial applications.

Item 85 is the use according to item 84 for interior applications, in particular for construction market applications and transportation market applications, in particular automotive and aerospace applications, more in particular for taped seal on body, taped seal on door, exterior and interior parts attachment and weather-strip tape applications for the automotive industry.

Item 86 is the use according to item 84 for electronic applications, in particular for the fixation of display panels in mobile hand held electronic devices.

Item 87 is the use according to item 84 for the bonding to a low surface energy substrate and/or a medium surface energy substrate, in particular automotive clear coats/paints.

EXAMPLES

The invention is further illustrated by the following examples. These examples are merely for illustrative purposes only and are not meant to be limiting on the scope of the appended claims.

Test Methods Applied:

180°-Peel-test at 300 mm/min (According to FINAT Test Method No. 2, 8th Edition 2009)

The single layer pressure sensitive adhesive films are laminated prior to testing on a 50 μm thick PET backing (commercially available as Hostaphan RN 50). The hereby obtained pressure sensitive adhesive strips are cut out in the machine direction from the pressure sensitive adhesive film sample material to provide test strips with a width of 12.7 mm and a length >120 mm. For test sample preparation the adhesive coated side of each PSA assembly strip is placed, after the liner is removed, with its adhesive side down on a clean test panel using light finger pressure. Next, the test samples are rolled twice with a standard FINAT test roller (weight 2 kg) at a speed of approximately 10 mm per second to obtain intimate contact between the adhesive mass and the surface. After applying the pressure sensitive adhesive assembly strips to the test panel, the test samples are allowed to dwell for 24 hours at ambient room temperature (23° C.+/−2° C., 50% relative humidity +/−5%) prior to testing.

For peel testing the test samples are in a first step clamped in the lower movable jaw of a Zwick tensile tester (Model Z020 commercially available from Zwick/Roell GmbH, Ulm, Germany). The pressure sensitive adhesive film strips are folded back at an angle of 90° and their free ends grasped in the upper jaw of the tensile tester in a configuration commonly utilized for 180° measurements. The tensile tester is set at 300 mm per minute jaw separation rate. Test results are expressed in Newton per 12.7 mm or Newton per 0.5 inch (N/12.7 mm or N/0.5 in). The quoted peel values are the average of two 180°-peel measurements.

Static Shear Test at 70° C. with 500 g (FINAT Test Method No. 8, 8th Edition 2009)

The test is carried out at 70° C. The pressure sensitive adhesive film is laminated on a 50 μm thick PET backing (commercially available as Hostaphan RN50). Test specimens are cut out of the sample material having a dimension of 13 mm by 175 mm. The liner is then removed and the adhesive strips are adhered onto Ceramic Clear 5 (CC5) plates with an overlap of 12.7×25.4 mm. A loop is prepared at the end of the test strip in order to hold the specified weight. Next, the test samples are rolled down four times with a standard FINAT test roller (weight 2 kg) at a speed of approximately 10 mm per second to obtain intimate contact between the adhesive mass and the surface. After applying the pressure sensitive adhesive assembly strips to the test panel, the test samples are allowed to dwell for 24 hours at ambient room temperature (23° C.+/−2° C., 50% relative humidity +/−5%) prior to testing.

Each sample is then placed into a vertical shear-stand (+2° disposition) at 70° C. provided with automatic time logging. After 10 minutes dwell time in the oven, a 500 g weight is hung into the loop. The time until failure is measured and recorded in minutes. Target value is 10.000 minutes. Two samples are measured for each construction. A recorded time of ">10000" indicates that the adhesive did not fail after 10000 min.

TGA Test Method

The TGA (Thermogravimetric Analysis) measurements are performed with a Q5000IR equipment from Texas Instruments. The samples are weighed in a platinum pan and placed with an auto sampler in the oven of the apparatus. The nitrogen flow through the oven is 25 mL/min, the nitrogen flow through the balance is 10 mL/min. The temperature is equilibrated at 30° C. and is held for 15 minutes. Then the temperature is increased to 90° C. with a ramp of 60° C./min. The 90° C. are then held for 30 minutes. In a next step, the temperature is increased to 120° C. with a ramp of 60° C./min. The 120° C. are held for 60 minutes. The weight losses during 30 minutes at 90° C. (VOC analysis) and during 60 minutes at 120° C. (FOG analysis) are recorded. The test is then completed by increasing the temperature to 800° C. with a ramp of 10° C./min. Then, the temperature is equilibrated at 600° C., the oven is purged with air and the temperature is increased to 900° C. with a ramp of 10° C./min.

Thermal Desorption Analysis of Organic Emissions According to VDA Test Method 278

VDA method 278 is a test method used for the determination of organic emissions from non-metallic trim components used to manufacture the interior of motor vehicles (VDA stands for "Verband der Automobilindustrie", the German Association of Automobilists). The method classifies the emitted organic compounds into two groups:

VOC value—the sum of volatile and semi-volatile compounds up to $n$-$C_{25}$ and FOG value—the sum of the semi-volatile and heavy compounds from $n$-$C_{14}$ to $n$-$C_{32}$ For measuring the VOC and FOG values, adhesive samples of 30 mg+/−5 mg are weighed directly into empty glass sample tubes. The volatile and semi-volatile organic compounds are extracted from the samples into the gas stream and are then re-focused onto a secondary trap prior to injection into a GC for analysis. An automated thermal desorber (Markes International Ultra-UNITY system) is hereby used for the VDA 278 testing.

The test method comprises two extraction stages:

VOC analysis, which involves desorbing the sample at 90° C. for 30 minutes to extract VOC's up to $n$-$C_{25}$. This is followed by a semi-quantitative analysis of each compound as μg toluene equivalents per gram of sample.

FOG analysis, which involves desorbing the sample at 120° C. for 60 minutes to extract semi-volatile compounds ranging from $n$-$C_{14}$ to $n$-$C_{32}$. This is followed by semi-quantitative analysis of each compound as μg hexadecane equivalents per gram of sample.

The VOC values expressed are the average of two measurements per sample. The higher value of the measurements is indicated as the result, as described in the VDA278 test method. In order to determine the FOG value, the second sample is retained in the desorption tube after the VOC analysis and reheated to 120° C. for 60 minutes.

Raw Materials Used:

The raw materials used are summarized in Table 1 below.

TABLE 1

Raw material list.

| Name | Description | Supplier |
|---|---|---|
| 2-EHA | 2-Ethyl hexyl acrylate (C8-acrylate): is an ester of 2-ethylalcohol and acrylic acid | BASF |
| AA | Acrylic acid | Arkema, Italy. |
| ABP | acryloxybenzophenone | Kraton polymers |
| Uvacure 1500 | 3,4-Epoxycyclohexylmethyl-3,4-epoxy-cylohexanecarboxylate. Thermal crosslinker. | Cytec Industries |
| IOTG | isooctyl thioglycolate, chain transfer agent | Sigma-Aldrich |
| Foral 3085 | Tackifying resin, a glycerol ester of highly hydrogenated refined wood rosin. | ExxonMobil |
| Irgacure 651 | Photoinitiator, 2,2-dimethoxy-1,2-diphenylethan-1-one | Ciba Specialty Chemicals |
| Irganox 1076 | Antioxidant, octadecyl-3-(3,5-di-tert-butyl-4-hydroxyphenyl)-propionate | Ciba Specialty Chemicals |

EXAMPLES

Example 1

Preparation of Pressure Sensitive Adhesive 1 (PSA1)

Preparation of the Hot Melt Processable Pressure Sensitive Adhesive Composition:

A copolymer of 2-EHA and AA is bulk polymerized under UV light sealed in ethylene vinyl acetate film pouches as described in U.S. Pat. No. 6,294,249 (Hamer et al.). Two sheets of 2.5 mil (51 micrometer) thick ethylene vinyl acetate, commercially available as VA-24 from Pliant Corp. of Evansville, IN, are heat sealed on the lateral edges and the bottom to form a rectangular pouch on a liquid form, fill, and seal machine. The pouch is filled with a pre-adhesive composition having 94 parts 2-EHA, 6 parts AA, 0.15 phr of Photoinitiator-1, 0.15 phr ABP, 0.4 phr Antioxidant-1, and 0.15 phr thermal crosslinker. The filled package is then heat sealed at the top in the cross direction through the monomer to form individual pouches measuring 13.4 cm by 4.3 cm by about 0.4 cm thick containing 27 grams of the pre-adhesive composition. The pouches are placed in a water bath that is maintained between about 16° C. and 32° C. and exposed to ultraviolet radiation (supplied by lamps having about 90 percent of the emissions between 300 and 400 nanometers (nm), and a peak emission at 351 nm) at an intensity of 4.55 mW/cm$^2$ for 21 minutes.

Preparation of the Pressure Sensitive Adhesive:

A 30-mm diameter co-rotating twin screw extruder, available as "ZSK-30" from Werner & Pfleiderer, Ramsey, NJ, is used to prepare a pressure sensitive adhesive coated tape. The twin screw extruder has 12 zones, each corresponding to one twelfth of the length of the screw, and a length to diameter ratio of 36:1. The twin screw extruder is operated at 400 rpm at 163° C. The acrylate copolymer in pouches, as described above, is fed into a 2 inch (51 mm) Single Packer Extruder commercially available from Bonnot, Uniontown, OH. The Single Packer Extruder masticates the polymer and feeds it into zone 2 of the twin screw extruder at a rate of 42.8 grams/minute. The tackifying resin (which is previously pre-cleaned using a wiped film evaporator, as described below) is fed via a split stream at a rate of 7.7 grams/minute into zone 4 and at a rate of 18.0 grams/minute into zone 6 of the extruder from a Dynamelt S Series Adhesive Supply Unit, set at 149° C. The melt mixture passes from the extruder into a polymer melt pump set at 177° C. (commercially available as "PEP-II 3 cc/rev" from Zenith Pumps of Monroe, NC) which pumps it at a rate of 2.92 cm$^3$/revolution into a rotary rod die set to 163° C. The melt mixture is coated onto a silicone-coated, densified kraft paper release liner as a continuous sheet of pressure sensitive adhesive having about 5 mil (0.13 mm) thickness.

Comparative Example 2

Preparation of Pressure Sensitive Adhesive 1 (PSA2)

Comparative example 2 (PSA2) is prepared according to the procedure of example 1, at the exception that the tackifying resin has not been pre-cleaned using a wiped film evaporator.

Examples 3 and 4

Pre-Cleaning Processes of Tackifying Resins and VOC Levels

Example 3

Preparation of Pre-Cleaned Tackifying Resin Using a Vacuum Oven

Tackifying resin Foral 3085 is placed in aluminum pans in pellet form. The pans are then placed in a vacuum oven and heated to 155° C. at 88 kPa. The tackifying resin is allowed to devolatilize overnight. The samples are taken out of the oven and analyzed according to the TGA test method described above. The results are shown in Table 1 below.

Example 4

Preparation of Pre-Cleaned Tackifying Resin Using a Wiped Film Evaporator

Tackifying resin Foral 3085 is processed using a wiped film evaporator (WFE), commercially available as Filmtruder® from LCI Corporation. The resin is fed at 115° C. and degassed at 175° C. The WFE is operated at 90 Pa and 400 rpm. An internal condenser is used to collect the distillate. The samples are taken out of the WFE and analyzed according to the TGA test method described above. The results are shown in Table 2 below.

TABLE 2

| Example | Cleaning method | Original VOC level (ppm) | VOC level after treatment (ppm) |
|---|---|---|---|
| 3 | Vacuum oven | 355 | 3.1 |
| 4 | Wiped film evaporator | 622 | BQL[1] |

[1]BQL: below quantitative limit of the instrument.

The results of Table 2 show how the unwanted volatile organic components (VOC) are removed from the tackifier when exposed to a heating step, and optional vacuum step.

Examples 5 and 6

Adhesion Properties

Pressure sensitive adhesives PSA1 and comparative example PSA2 are subjected to 180°-peel and static shear adhesion test methods as described above. The results are summarized in Table 3 below.

TABLE 3

| Example | Pressure sensitive adhesive | 180° Peel on stainless steel (N/12.7 mm) | Shear strength (minutes) |
|---|---|---|---|
| 5 | PSA1 | 42 | >10,000 |
| 4 | PSA2 | 18 | 800 |

The results of Table 3 show that both peel and shear performance increase when using the pre-cleaned tackifying resin, when compared to using a PSA composition not including a pre-cleaned tackifying resin.

The invention claimed is:

1. A process of manufacturing a pressure sensitive adhesive, comprising the steps of:
   a) providing a hot melt mixing apparatus comprising a reaction chamber;
   b) providing a hot melt processable pressure sensitive adhesive composition comprising:
      (1) a (meth)acrylate copolymer component comprising:
         i. one or more $C_1$-$C_{32}$ (meth)acrylic acid ester monomer units;
         ii. one or more ethylenically unsaturated monomer units having functional groups selected from the group consisting of acid, hydroxyl, acid anhydride, epoxide, amine, amide groups, and any combinations thereof; and
         iii. one or more ethylenically unsaturated monomer units which are copolymerizable with monomer units (i) and/or (ii); and
      (2) a crosslinking system selected from the group consisting of thermal crosslinking systems, actinic radiation crosslinking systems, and a combination thereof;
      the hot melt processable pressure sensitive adhesive composition
      (3) optionally further comprising at least one of expandable microspheres; and
      (4) at least one pigment;
   c) providing a polymeric resin;
   d) subjecting the polymeric resin to a heating step (thereby at least partly remove low Volatile Organic Compounds (VOC) from the polymeric resin) thereby forming a (pre-)cleaned polymeric resin;
   e) incorporating the (pre-)cleaned polymeric resin and the hot melt processable pressure sensitive adhesive composition in the reaction chamber of the hot melt mixing apparatus;
   f) mixing the hot melt processable pressure sensitive adhesive composition and the (pre-) cleaned polymeric resin in the hot melt mixing apparatus thereby forming a hot melt blend;
   g) removing the hot melt blend from the hot melt mixing apparatus; and
   h) crosslinking the hot melt blend.

2. A process according to claim 1, wherein the hot melt blend has a Volatile Organic Compound (VOC) value of less than 1500 ppm when measured by thermal desorption analysis according to test method VDA278.

3. A process according to claim 1, wherein the hot melt mixing apparatus is selected from the group of single- and multi-screw extruders.

4. A process according to claim 1, wherein the crosslinking system is a thermal crosslinking system comprising a thermal crosslinker and optionally, a crosslinking accelerator.

5. A process according to claim 1, wherein the polymeric resin is selected from the group consisting of tackifying resins, plasticizing resins, and any combinations or mixtures thereof.

6. A process according to claim 1, wherein the hot melt processable pressure sensitive adhesive composition comprises:
   a) from 20 wt % to 80 wt % of the (meth)acrylate (co)polymer component, based on the weight of the hot melt processable pressure sensitive adhesive composition;
   b) from 0.1 wt % to 10 wt % of a crosslinking agent, based on the weight of the hot melt processable pressure sensitive adhesive composition;
   c) from 20 wt % to 70 wt % of the polymeric resin, based on the weight of the hot melt processable pressure sensitive adhesive composition;
   the hot melt processable pressure sensitive adhesive composition
   d) optionally further comprising at least one of from 1 wt % to 20 wt % of the expandable microspheres, based on the weight of the hot melt processable pressure sensitive adhesive composition; and
   e) from 0.5 wt % to 20 wt % of the at least one pigment, based on the weight of the hot melt processable pressure sensitive adhesive composition.

7. A process according to claim 1, wherein the step of subjecting the polymeric resin to a heating step (thermal treatment) is performed by subjecting the polymeric resin to any of thermal heating, radiation heating, convection heating, induction heating, ultrasonic vibration heating, and any combinations thereof.

8. A process according to claim 1, wherein the step of subjecting the polymeric resin to a heating step is performed in a feeding equipment for polymeric resins associated with the hot melt mixing apparatus, in particular a multi- or single screw extruder or a planetary roller extruder.

9. A process according to claim 1, wherein the step of subjecting the polymeric resin to a heating step is performed in a Wiped Film Evaporator.

10. A crosslinked pressure sensitive adhesive which is obtained by a process according to claim 1, wherein the crosslinked pressure sensitive adhesive has a Volatile Organic Compound (VOC) value of less the 300 ppm when measured by thermal desorption analysis according to test method VDA278.

* * * * *